(12) United States Patent
Shawaf et al.

(10) Patent No.: US 10,589,897 B1
(45) Date of Patent: Mar. 17, 2020

(54) ROTO MOLDED PALLET

(71) Applicant: Paxxal Inc., Noblesville, IN (US)

(72) Inventors: Omar Shawaf, Riyadh (SA); Ezzeldin Elmassry, Noblesville, IN (US); Moustapha Bahsoun, Beirut (LB); Michael Laible, Maitland, FL (US); Ben Stoller, Orlando, FL (US); John Charny, Richmond Heights, OH (US)

(73) Assignee: Paxxal Inc., Noblesville, IN (US)

( * ) Notice: Subject to any disclaimer, the term of this patent is extended or adjusted under 35 U.S.C. 154(b) by 0 days.

(21) Appl. No.: 16/101,956

(22) Filed: Aug. 13, 2018

Related U.S. Application Data

(60) Provisional application No. 62/544,183, filed on Aug. 11, 2017.

(51) Int. Cl.
*B65D 19/00* (2006.01)
*B29C 41/02* (2006.01)
*B29L 31/00* (2006.01)

(52) U.S. Cl.
CPC .......... *B65D 19/0038* (2013.01); *B29C 41/02* (2013.01); *B29L 2031/7178* (2013.01);
(Continued)

(58) Field of Classification Search
CPC ............ B65D 19/0073; B65D 19/0038; B65D 19/0012; B65D 19/0026; B65D 19/22; B65D 19/0004; B65D 19/06; B65D 19/20; B65D 19/38; B65D 2519/00014; B65D 2519/00049; B65D 2519/00273; B65D 2519/00293; B65D 2519/00323; B65D 2519/00368; B65D 2519/00572;
(Continued)

(56) References Cited

U.S. PATENT DOCUMENTS 3,511,191 A * 5/1970 Di Verdi ............ B65D 19/0018
108/57.28
3,691,964 A 9/1972 Larson et al.
(Continued)

FOREIGN PATENT DOCUMENTS

EP 1 021 346 B1 7/2002
EP 1 744 966 B1 12/2008
(Continued)

OTHER PUBLICATIONS

European Search Report issued in related EP19188157,2 dated Nov. 5, 2019.
(Continued)

*Primary Examiner* — Janet M Wilkens
(74) *Attorney, Agent, or Firm* — Woodard, Emhardt, Henry, Reeves & Wagner, LLP

(57) ABSTRACT

Certain embodiments of the present disclosure describe a pallet assembly having a support assembly and a stringer. The support assembly includes a deck and a plurality of blocks that extend from the deck. The deck and the blocks are unitarily formed to create a contiguous outer shell that defines a common internal space that is filled with a support material. The blocks include extension portions that correspond to openings defined in the stringer. The extensions are received in a corresponding opening to attach the stringer to the support assembly.

19 Claims, 34 Drawing Sheets

(52) U.S. Cl.
CPC .............. *B65D 2519/00034* (2013.01); *B65D 2519/00044* (2013.01); *B65D 2519/00069* (2013.01); *B65D 2519/00273* (2013.01); *B65D 2519/00288* (2013.01); *B65D 2519/00318* (2013.01); *B65D 2519/00791* (2013.01)

(58) Field of Classification Search
CPC ........... B65D 2519/00373; B65D 2519/00935; B65D 2519/00034; B65D 2519/00069; B65D 2519/00104; B65D 2519/0029; B65D 2519/00288; B65D 2519/00333; B65D 21/0201; B65D 2519/00044; B65D 2519/00318; B65D 2519/00791; B29L 2031/7178; B29C 41/02
USPC ...... 108/51.11, 901, 902, 57.29, 57.25, 51.3, 108/57.17, 57.19, 57.33, 55.1, 53.1; 206/386, 595–600
See application file for complete search history.

(56) References Cited

U.S. PATENT DOCUMENTS

| | | | |
|---|---|---|---|
| 3,880,092 A | | 4/1975 | Seeber et al. |
| 3,915,099 A | | 10/1975 | Wies et al. |
| 4,051,787 A | | 10/1977 | Nishitani et al. |
| 5,186,338 A | * | 2/1993 | Boutet .................. G03B 42/045 108/53.1 |
| 5,193,464 A | | 3/1993 | Morden |
| 5,197,395 A | * | 3/1993 | Pigott ................ B65D 19/0012 108/56.1 |
| 5,460,292 A | | 10/1995 | Holman |
| 5,492,069 A | * | 2/1996 | Alexander ......... B65D 19/0069 108/53.3 |
| D379,021 S | | 4/1997 | Wies |
| 5,666,886 A | | 9/1997 | Alexander et al. |
| 6,053,466 A | | 4/2000 | Jordan et al. |
| 6,199,488 B1 | | 3/2001 | Favaron et al. |
| 6,749,418 B2 | * | 6/2004 | Muirhead ............. B29C 51/165 425/515 |
| 7,752,980 B2 | | 7/2010 | Muirhead |
| 7,963,410 B2 | | 6/2011 | Joergensen et al. |
| 8,006,629 B2 | * | 8/2011 | Naidu ................ B65D 19/0038 108/56.3 |
| 8,596,207 B2 | * | 12/2013 | Dubois .............. B65D 19/0002 108/53.1 |
| 8,596,459 B2 | | 12/2013 | Hulzingh et al. |
| 8,701,569 B2 | | 4/2014 | Linares |
| 8,955,709 B2 | | 2/2015 | Lorenz et al. |
| 9,138,945 B2 | | 9/2015 | Rimmer |
| 9,221,580 B2 | * | 12/2015 | Zelek .................. B65D 19/0018 |
| 9,352,876 B2 | | 5/2016 | Muirhead |
| 10,005,586 B1 | | 6/2018 | Miller |
| 2004/0159267 A1 | * | 8/2004 | Markling ................ B29C 49/20 108/57.25 |
| 2006/0272556 A1 | * | 12/2006 | Apps .................... B65D 19/004 108/53.1 |
| 2006/0278138 A1 | * | 12/2006 | Chi .................... B65D 19/0028 108/57.25 |
| 2007/0028814 A1 | | 2/2007 | Swistak et al. |
| 2008/0236455 A1 | * | 10/2008 | Naidu ................ B65D 19/0038 108/56.1 |
| 2010/0043678 A1 | * | 2/2010 | Linares ..................... B32B 3/12 108/57.25 |
| 2010/0154685 A1 | | 6/2010 | Arinstein |
| 2010/0206200 A1 | * | 8/2010 | Tosse ................. B65D 19/0073 108/56.1 |
| 2011/0179978 A1 | * | 7/2011 | Schmitt ............... B29C 45/2628 108/53.3 |
| 2011/0253016 A1 | * | 10/2011 | Leakey .............. B65D 19/0012 108/56.3 |
| 2012/0318692 A1 | | 12/2012 | Kellerer |
| 2013/0133557 A1 | * | 5/2013 | Yoshinaga ............ B29C 44/128 108/57.25 |
| 2014/0137775 A1 | | 5/2014 | Plattner |
| 2014/0158025 A1 | * | 6/2014 | Apps ................... B29C 45/0003 108/57.25 |

FOREIGN PATENT DOCUMENTS

| | | |
|---|---|---|
| EP | 2 733 084 A1 | 6/2014 |
| JP | H06 1236 U | 1/1994 |
| JP | 2004131162 A | 4/2004 |
| WO | WO 2016/154260 A1 | 9/2016 |
| WO | WO 2018/051155 A1 | 3/2018 |

OTHER PUBLICATIONS

Machine translation of JP2004131162A by Patent Translate European Patent Office dated Nov. 15, 2019 (pp. 19).

* cited by examiner

ROTO MOLDED PALLET

CROSS-REFERENCE TO RELATED APPLICATIONS

This application claims the benefit of U.S. Provisional Application No. 62/544,183, filed Aug. 11, 2017, which is hereby incorporated by reference.

BACKGROUND

This disclosure is in the field of plastic molded pallets.

Pallets are a commonly used structure that may support goods during transport while also allowing the goods to be lifted by a forklift, pallet jack, or other similar instrument. Pallets are commonly made from wood, but may also be made from other materials, such as plastic, metal, or concrete. In particular, plastic pallets may provide some advantages over other types of pallets. Plastic pallets are durable and have a long life span. They also may weigh less than a concrete or wooden pallet, reducing the cost of shipping. Additionally, plastic may be easier to clean or sterilize than a wooden or concrete pallet.

Because pallets are so widely used, they can represent a sizable expense in the shipping industry. Therefore it is beneficial to have a strong, durable pallet that is able to withstand the forces of the load that it is supporting as well as withstand forces from other objects such as a forklift or pallet jack without breaking.

DETAILED DESCRIPTION OF THE DRAWINGS

Figure 1:
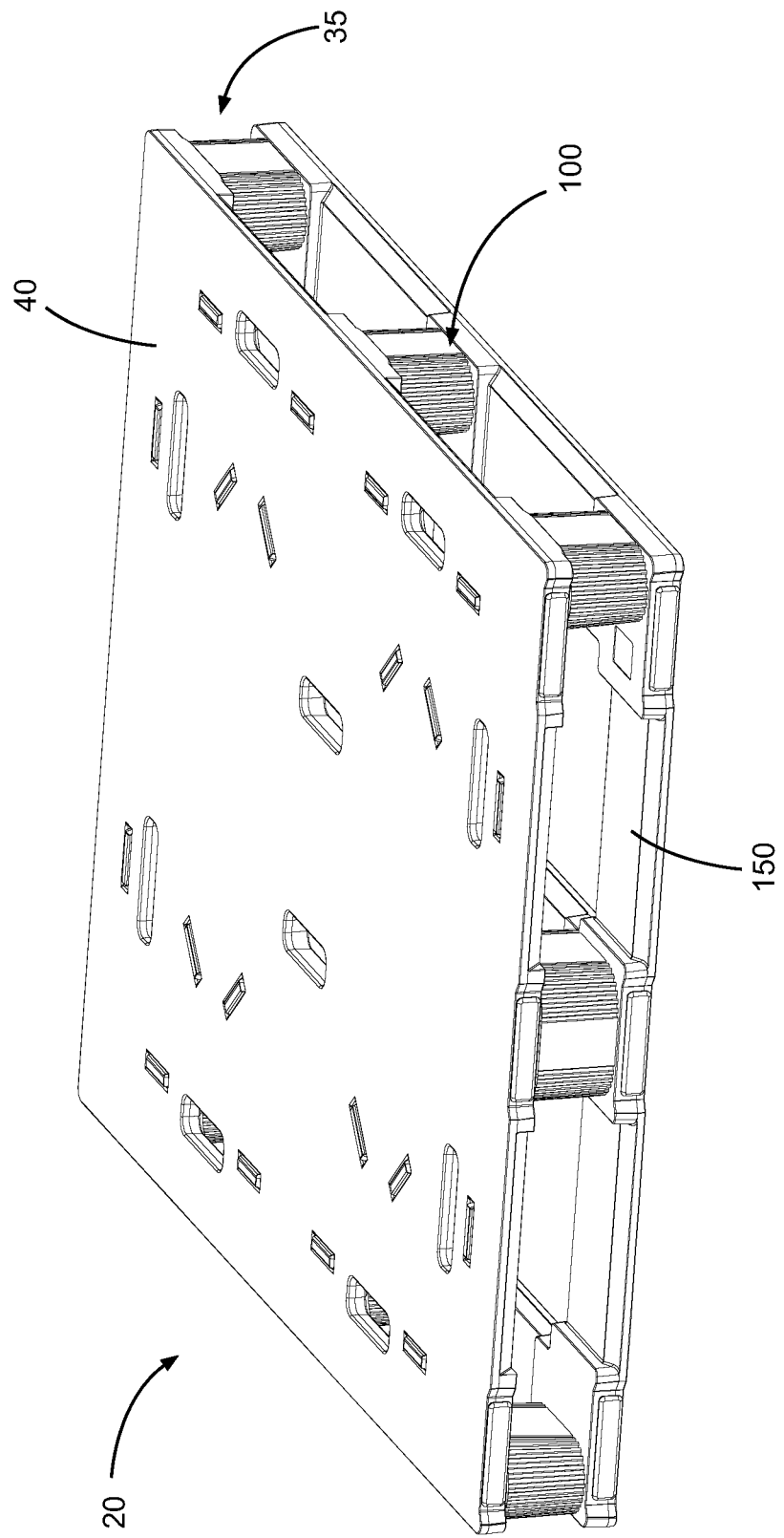
FIG. 1 is a perspective view of a pallet assembly.

Reference will now be made to certain embodiments and specific language will be used to describe the same. It will nevertheless be understood that no limitation of the scope of this disclosure and the claims is thereby intended, such alterations, further modifications and further applications of the principles described herein being contemplated as would normally occur to one skilled in the art to which this disclosure relates. In several figures, where there are the same or similar elements, those elements are designated with the same or similar reference numerals.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

Figure 2:
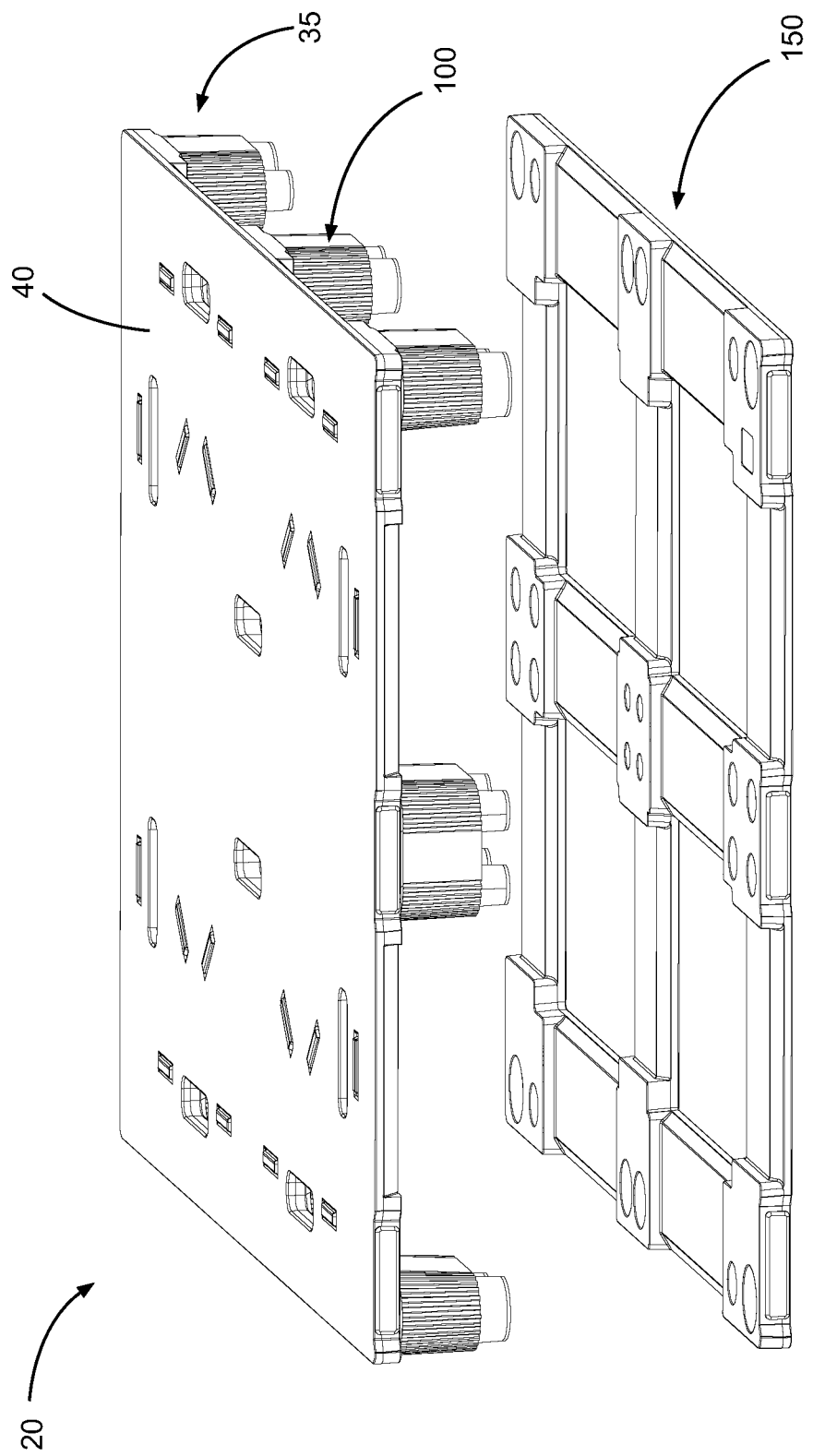
FIG. 2 is an exploded view of the pallet assembly of FIG. 1

FIG. 1 is a perspective view of a pallet assembly 20. Pallet assembly 20 includes a support assembly 35 that comprises a deck 40, and a plurality of blocks 100 extending from deck 40. Pallet assembly 20 also includes a stringer 150 that is parallel to deck 40 and connected to blocks 100. As shown in FIG. 2, deck 40 and blocks 100 are formed as a unitary piece that is connected to stringer 150.

Figure 3:
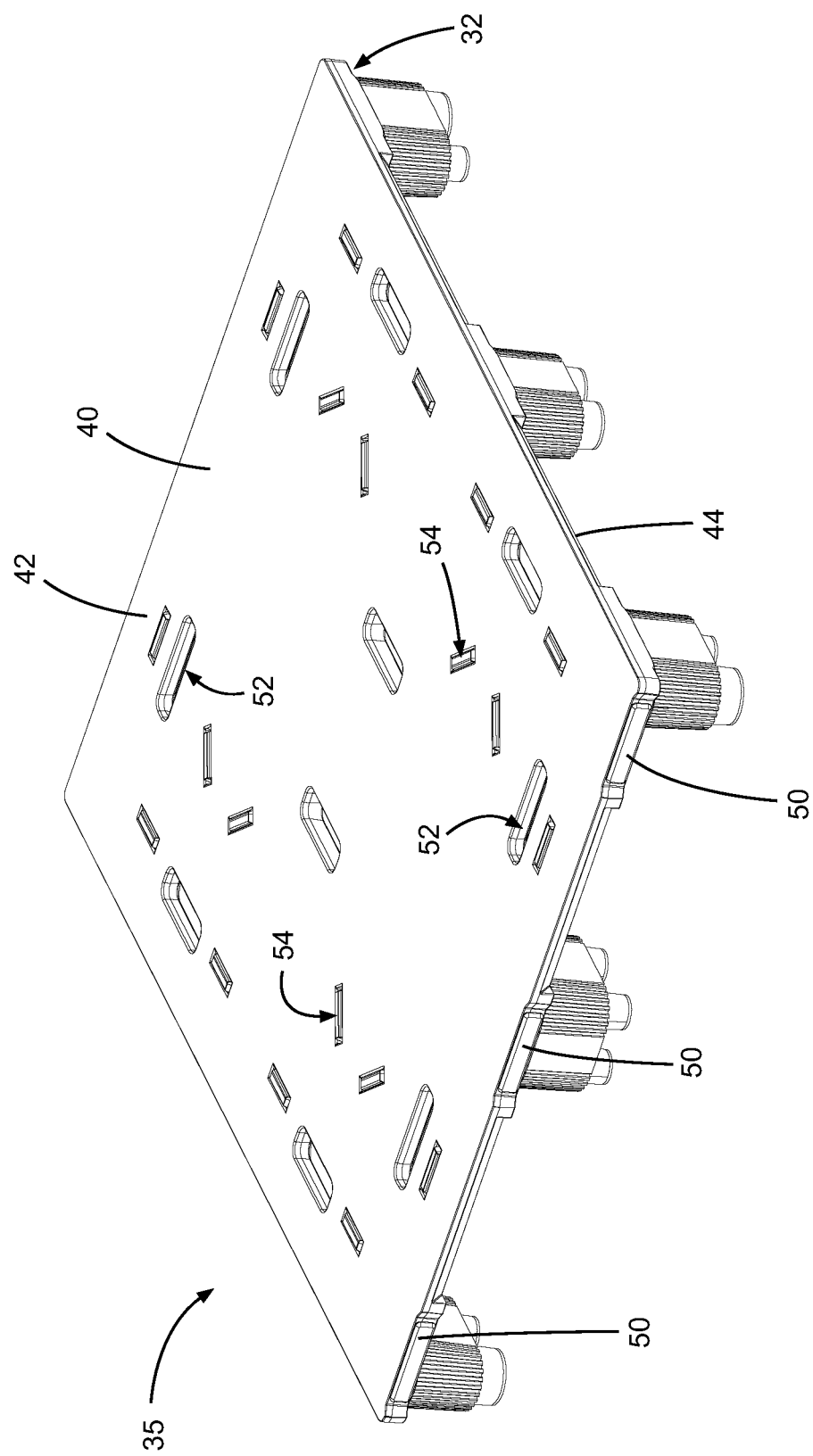
FIG. 3 is a top perspective view of a support assembly, a component of the pallet assembly of FIG. 1.
Figure 14:
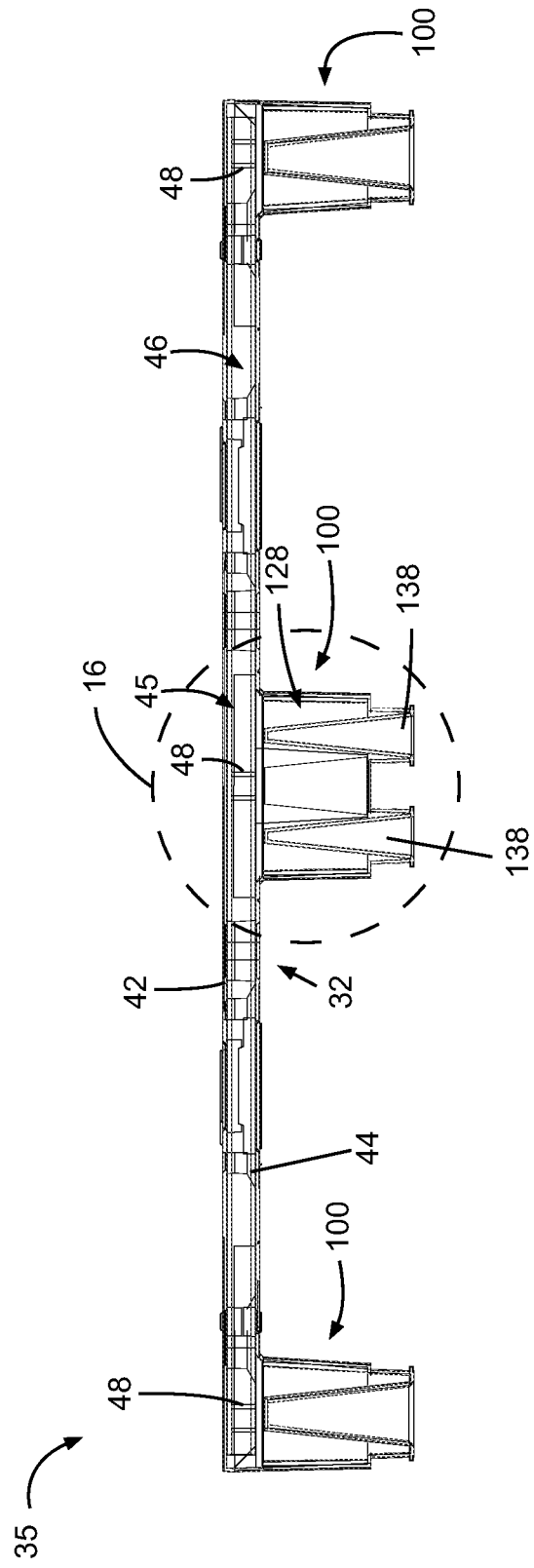
FIG. 14 is a cross-sectional front elevational view of the support assembly of FIG. 3 taken along line 14-14 of FIG. 4.

Support assembly 35, as shown in FIG. 3, includes a deck 40 having an upper surface 42 and a lower surface 44 that enclose a interior 46 (see FIG. 14). Reinforcement members 48, such as a support bar, may be positioned within the hermetically sealed interior 46 to provide additional load bearing support for deck 40. Blocks 100 extend from lower surface 44. Deck 40 and blocks 100 form a contiguous outer shell 32 that defines a common internal cavity 45 that is formed by the interior 46 of deck 40 and the interior 128 of blocks 100 (see FIG. 14). In some embodiments, outer shell 32 is formed from a plastic shell material.

Deck 40 may be made of plastic or another suitable composite material. As an example, deck 40 may have a multi-layer, multi-polymer construction for strength and rigidity. In some embodiments, deck 40 may have an external layer of linear low density polyethylene (LLDPE). The layered structure of deck 40 allows additives for improved performance to be added to the external layer without affecting the structure of the core material.

Figure 15:
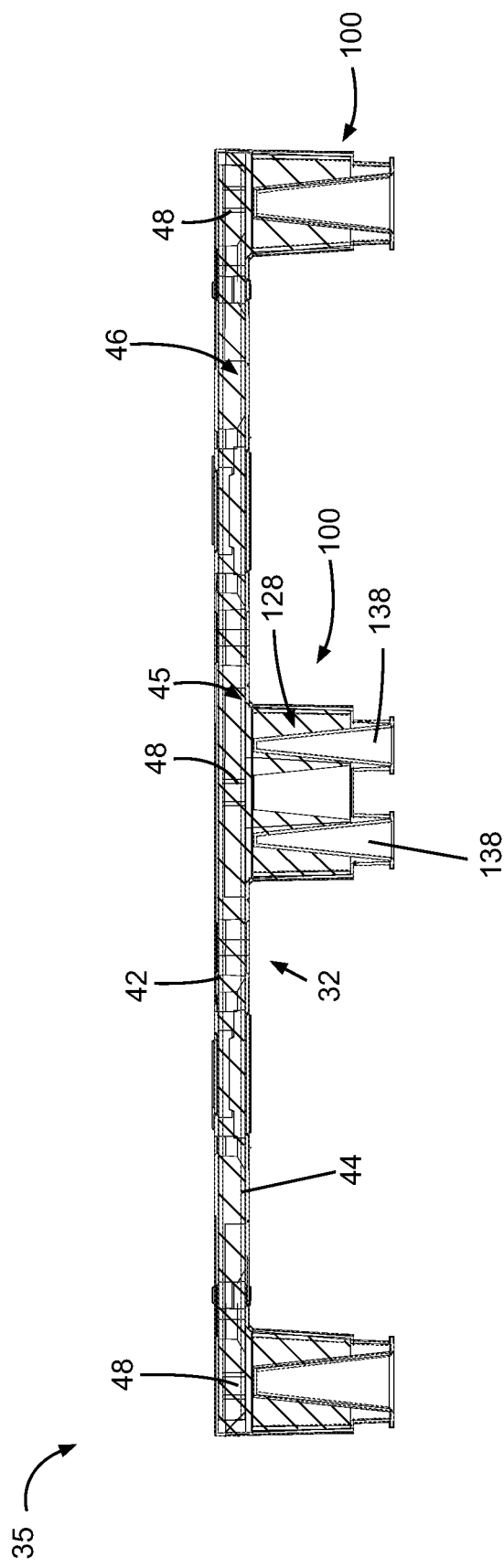
FIG. 15 is an alternative view of FIG. 14 highlighting the portions of the support assembly of FIG. 3 that are filled with a support material.

In some embodiments, high density polyethylene (HDPE) may be used as a support material that fills or substantially fills internal cavity 45 defined within support assembly 35 (see FIG. 15). The support material may be more rigid than the material used for outer shell 32 to provide pallet assembly 20 with additional strength. In some embodiments, the support material may be a foamed material that provides increased strength and rigidity but also is lighter than a solid material, to assist to reduce the overall weight of pallet assembly 20. Additional support materials may be used to create a mixture of plastic and non-plastic materials that is used as the support material. As an example, these additional filler materials may be crushed minerals, silica sand, fibers, porous materials such as pumice and flue ash, and/or filler material as described in any of U.S. Pub. No. 2007/0063381, U.S. Pub. No. 2008/0110377, or U.S. Pat. No. 9,138,945.

The mixture of materials used for both the outer layer and the support material may be chosen to optimize the desired characteristics of the pallet assembly 20. For example, the materials used for each layer may be chosen to provide strength, impact resistance, UV resistance, rigidity, and/or load capacity. Preferably, the outer layer is a plastic material, while the support material used for filling the common interior space of support assembly 35 may be a mixture of plastics and nonplastics.

Internal cavity 45 may be accessed through fill ports 50. In the embodiment shown in FIG. 3, fill ports 50 are positioned above blocks 100; however, fill ports 50 may be at different location in other embodiments. Each fill port 50 may include a plug that prevents access to internal cavity 45 and may help keep support material within interior 46 when pallet assembly 20 is in use.

As shown in FIG. 3, apertures 52, 54 are defined through the contiguous outer shell 32. Each of the apertures 52, 54 extend through upper surface 42 of deck 40 and also through lower surface 44 of deck 40. Interior walls define the sides of apertures 52, 54 and maintain the hermetic seal of interior 46.

Figure 4:
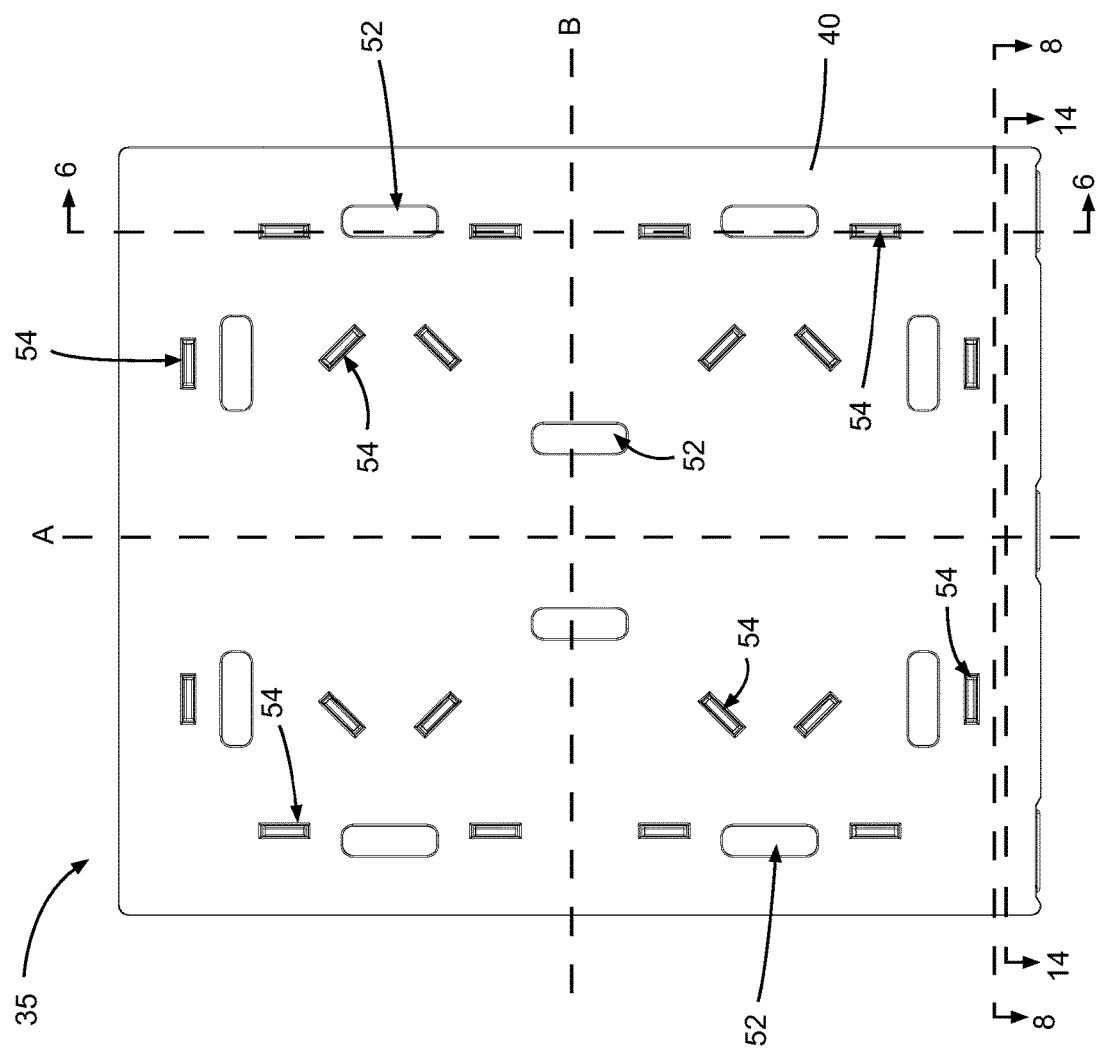
FIG. 4 is a top plan view of the support assembly of FIG. 3.

Hand hold apertures 52 are generally larger than insert apertures 54 that receive resilient inserts 60. The larger hand hold apertures 52 may be configured for use as hand holds to assist in manually carrying pallet assembly 20. As shown in FIG. 4, several sets of hand hold apertures 52 may be arranged on deck 40 to allow pallet assembly 20 to be carried in different orientations. A pair of hand hold apertures 52 may be positioned near each edge of deck 40 to allow a user to carry pallet assembly 20 at that adjacent edge. Additional hand hold apertures 52 may be positioned in the middle of deck 40 to allow a user to pick up pallet assembly 20 at its center. Other embodiments may include additional hand hold apertures 52 or may include fewer apertures 52 than what is shown in FIG. 3.

Upper surface 42 and apertures 52, 54 form a support area for objects or items placed on support assembly 35. In some embodiments, the number and size of hand hold apertures 52 and insert apertures 54 may be limited so that at least 90 percent of the support area is formed by the upper surface 42 and five percent or less of the support area is made up of apertures 52, 54. Other embodiments may have different ratios of surface to apertures. For example, in some embodiments, upper surface 42 may make up at least 90 percent of the support area and apertures 52, 54 may comprise 10 percent or less of the support area. Pallet assembly 20 may be governed by the Grocery Manufacturing Association (GMA) specifications.

As shown in FIG. 4, insert apertures 54 may be distributed over deck 40. The position and the number of insert apertures 54 may be varied as desired. Some insert apertures 54 may be positioned near the edge of deck 40 while other insert apertures 54 may be positioned closer to the center of deck 40. In some embodiments, some of the insert apertures may be positioned midway between adjacent blocks 100. Additionally, the orientation of insert apertures 54 may also be varied. For example, in the embodiment shown, deck 40 includes a longitudinal axis A and a latitudinal axis B positioned on the plane of deck 40. Some of the insert apertures 54 may be parallel to longitudinal axis A, while other insert apertures 54 may be parallel to latitudinal axis B. Still other insert apertures 54 may be oblique to both longitudinal axis A and latitudinal axis B. In the embodiment shown in FIG. 4, some insert apertures 54 are oriented at approximately a 45 degree angle with respect to longitudinal axis A or latitudinal axis B.

Figure 5:
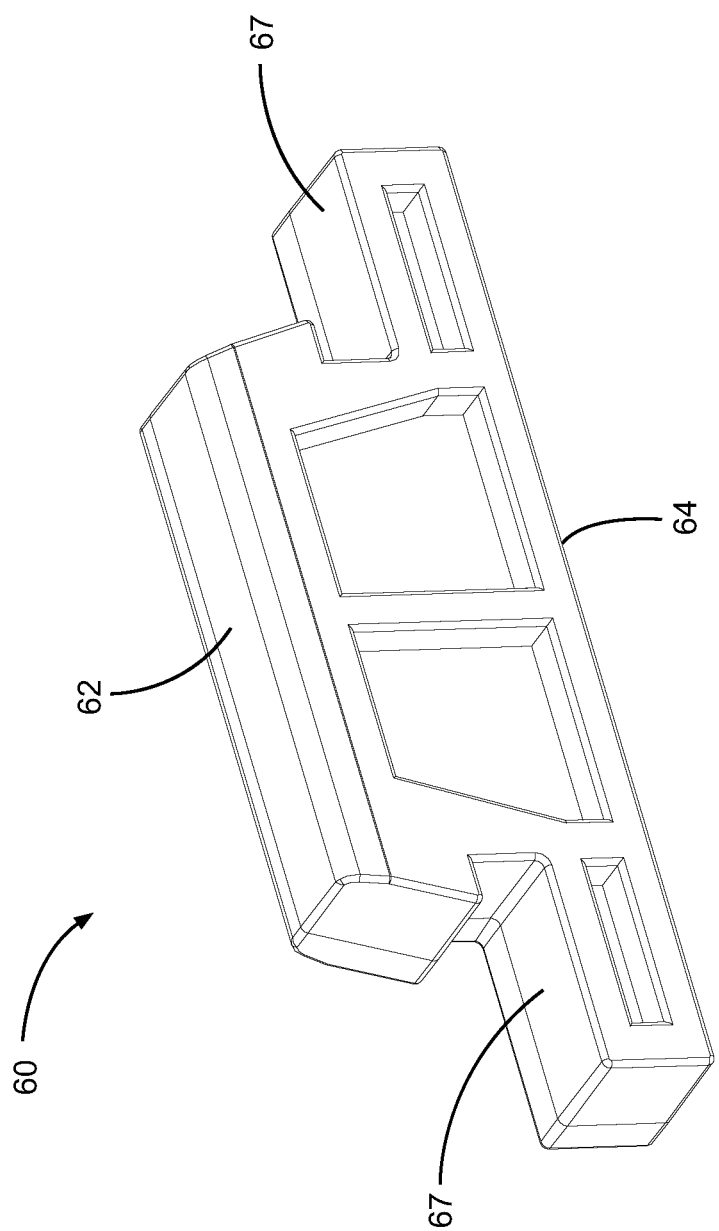
FIG. 5 is a top perspective view of an insert.

In some embodiments, resilient inserts 60, shown in FIG. 5, may be positioned within insert apertures 54. Resilient insert 60 includes an upper face 62 and a lower face 64. The bottom portion of resilient insert 60 includes a pair of feet 67 extending from lower face 64. Resilient insert 60 may be made from rubber or another suitable, resilient material. Resilient inserts 60 are more resistant than deck 40.

Figure 6:
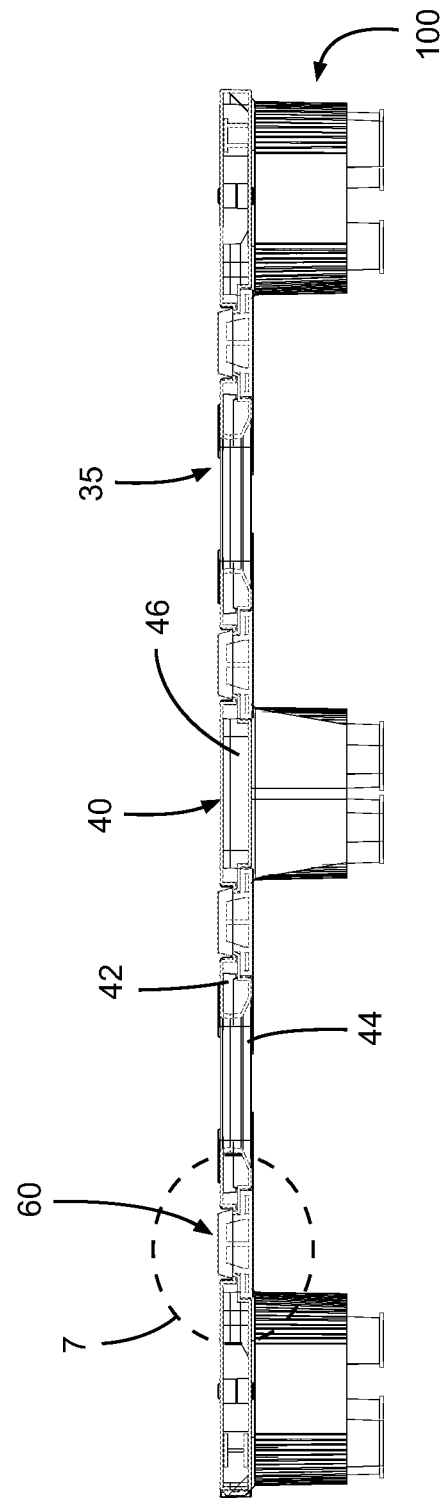
FIG. 6 is a cross-sectional right elevational view of the support assembly of FIG. 3 taken along line 6-6 of FIG. 4.

Resilient insert 60 is shown within an insert aperture 54 in FIG. 6. Upper face 62 of resilient insert 60 protrudes away from upper surface 42 of deck 40. Lower face 64 protrudes from, or alternatively may be flush with, lower surface 44 of deck 40. The protruding upper face 62 may serve as a contact surface for items placed on support assembly 35 and may help prevent damage to deck 40. Additionally, resilient insert 60 may provide a higher coefficient of friction than upper surface 42 of deck 40 to help reduce movement of any item or items placed on support assembly 35.

Figure 7:
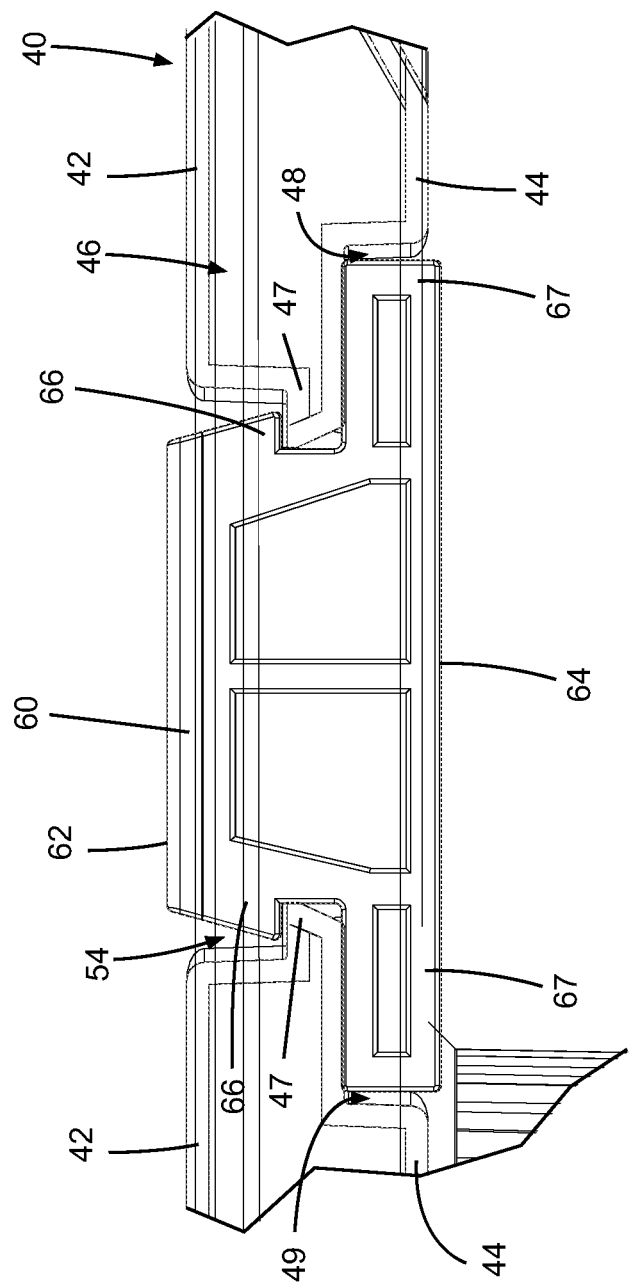
FIG. 7 is a partial cross-sectional right elevational view of a deck of the support assembly as shown in FIG. 6.

FIG. 7 illustrates an embodiment of a resilient insert 60 positioned within an insert aperture 54. Resilient insert 60 tapers from a pair of flanges 66 to upper face 62. When resilient insert 60 is inserted into insert aperture 54, flange 66 contacts and rests on shoulders 47 extending from deck 40, blocking resilient insert 60 from falling through insert aperture 54. Feet 67 extend from lower face 64 of resilient insert 60 and fit into recesses 49 in deck 40. Resilient inserts 60 and apertures 54 may be configured to avoid retaining liquid on deck 40. In the illustrated embodiment, the fit between flanges 66 and shoulders 47 is not tight enough to provide a seal from liquids that may be present on upper surface 42 of deck 40. The fit between feet 67 and recesses 49 in the illustrated embodiment is designed to allow liquid on upper surface 42 to drain. Alternatively, resilient inserts 60 may be configured to fit in recesses 49 to block the flow of liquids through recesses 49.

Although FIG. 7 shows a certain embodiment of a resilient insert 60 and its placement within a grip aperture 54 in deck 40, in other embodiments, any other suitable attachment arrangements may be used. For example, resilient insert 60 may be rectangular and be held in grip aperture 54 by a friction fit. In other embodiments, resilient insert may be adhered to deck 40 within grip aperture 54.

Figure 8:
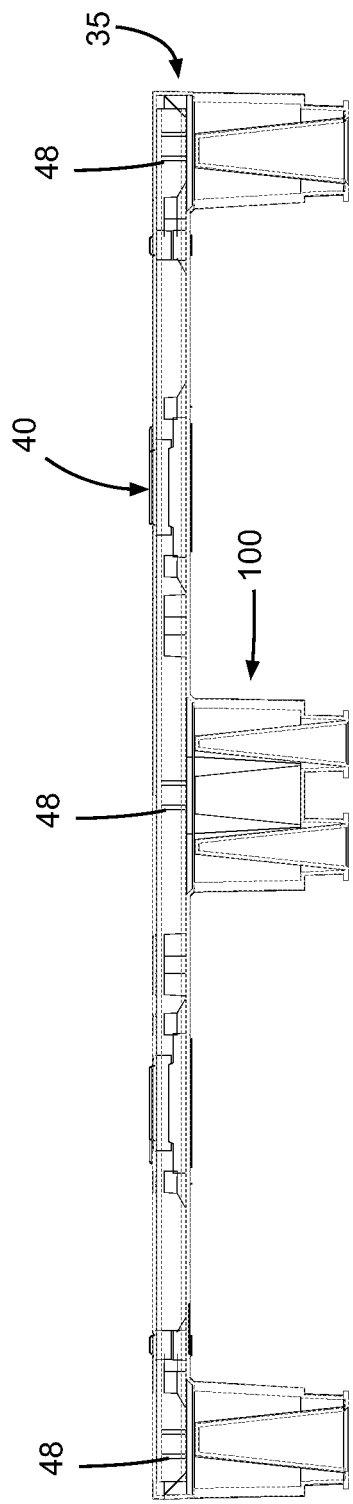
FIG. 8 is a cross-sectional front elevational view of the support assembly of FIG. 3 taken along line 8-8 of FIG. 4.

Optionally, reinforcement members 48 may also be sized and positioned to modify the weight distribution and loading capacity of pallet assembly 20 as desired. As shown in FIG. 8, reinforcement members may be arranged above blocks 100, within interior 46, and may extend substantially the entire height and/or width of deck 40. In the embodiment shown, reinforcement members 48 have a top surface that abuts upper surface 42 and two legs that extend to lower surface 44. However, in other embodiments, reinforcement members 48 may have other shapes. For example, reinforcement member 48 may have a square or rectangular cross-section or may be shaped like an I-beam. Although three reinforcement members 48 are shown in interior 46 in FIG. 8, other embodiments may include more or fewer reinforcement members 48.

Figure 9:
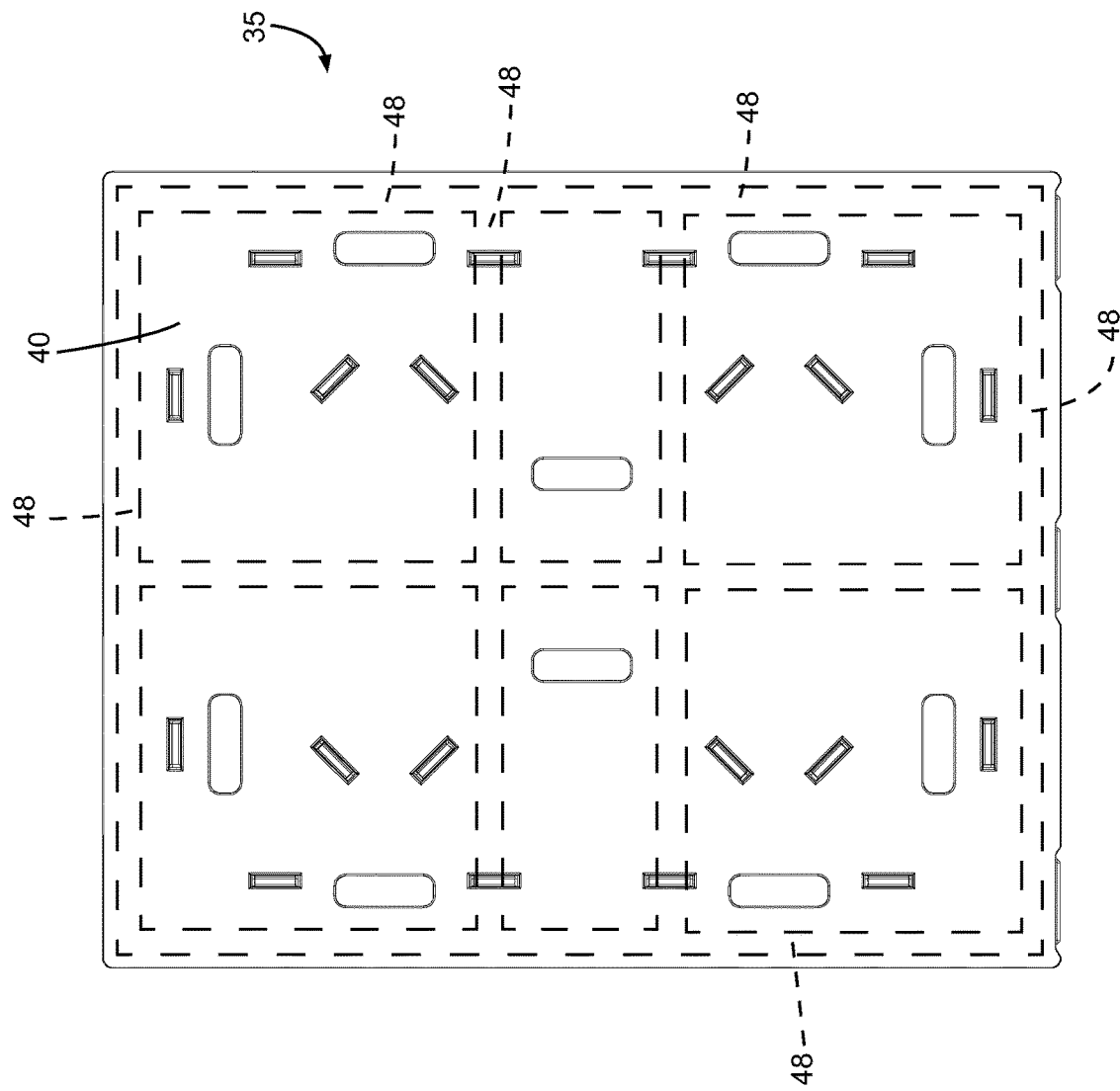
FIG. 9 is a top plan view of the support assembly of FIG. 3 showing positioning of reinforcement members within the support assembly.

FIG. 9 shows another possible arrangement of reinforcement members 48 within internal cavity 45 of deck 40. In this embodiment, reinforcement members 48 are arranged around the outer perimeter of deck 40. Additional reinforcement member 48 extend through the center of deck 40. As shown, reinforcement members 48 may extend across substantially the entire width or the entire length of deck 40.

Figure 10:
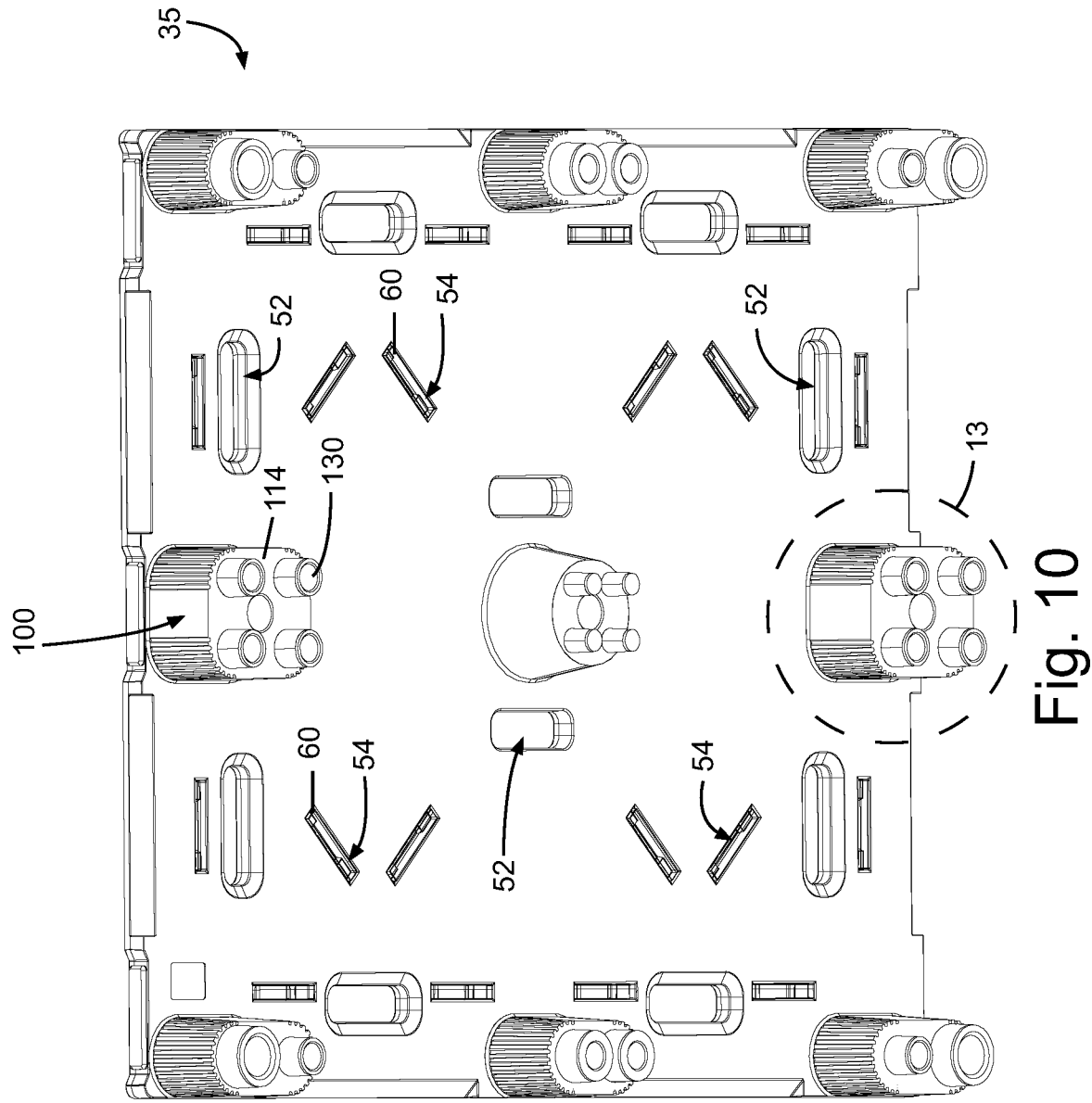
FIG. 10 is a bottom perspective view of the support assembly of FIG. 3.
Figure 11:
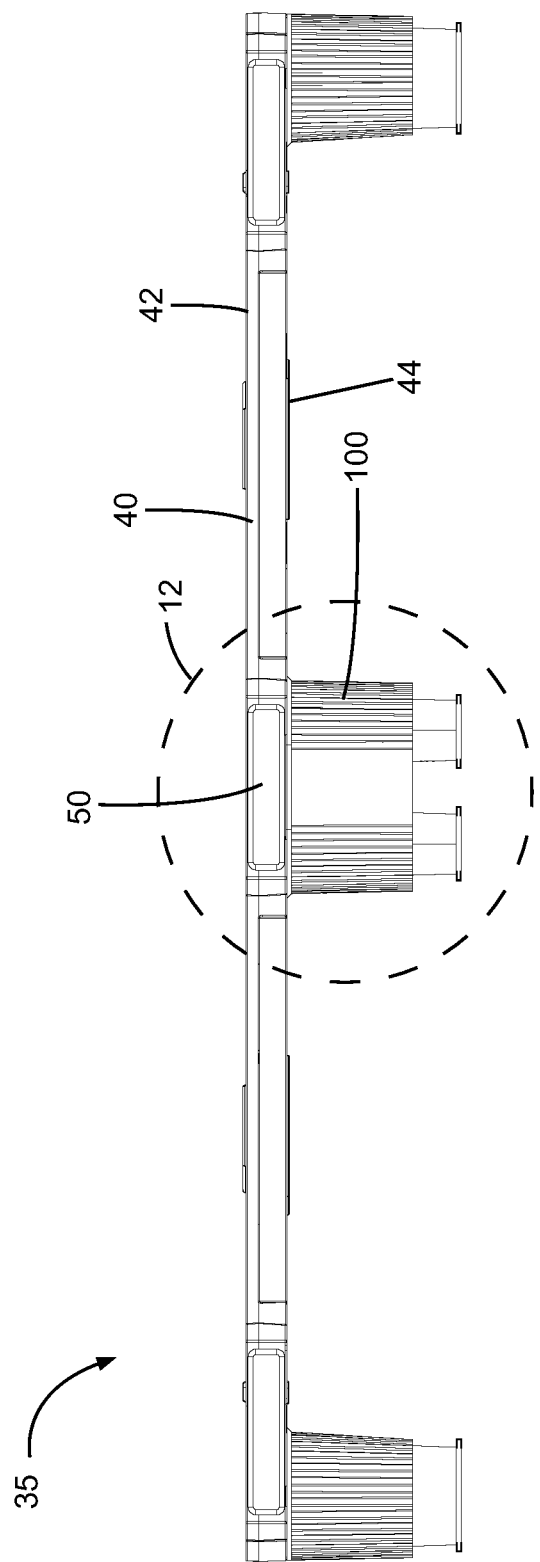
FIG. 11 is a front elevational view of the support assembly of FIG. 3.

As illustrated in FIGS. 10-11, support assembly 35 may include multiple blocks 100 extending from the lower surface 44 of deck 40. In the embodiment shown in FIG. 10, support assembly 35 includes nine blocks evenly distributed across lower surface 44. Other embodiments may include either more or fewer blocks 100. Additionally, other embodiments may have a different distribution of blocks 100 on lower surface 44.

Figure 12:
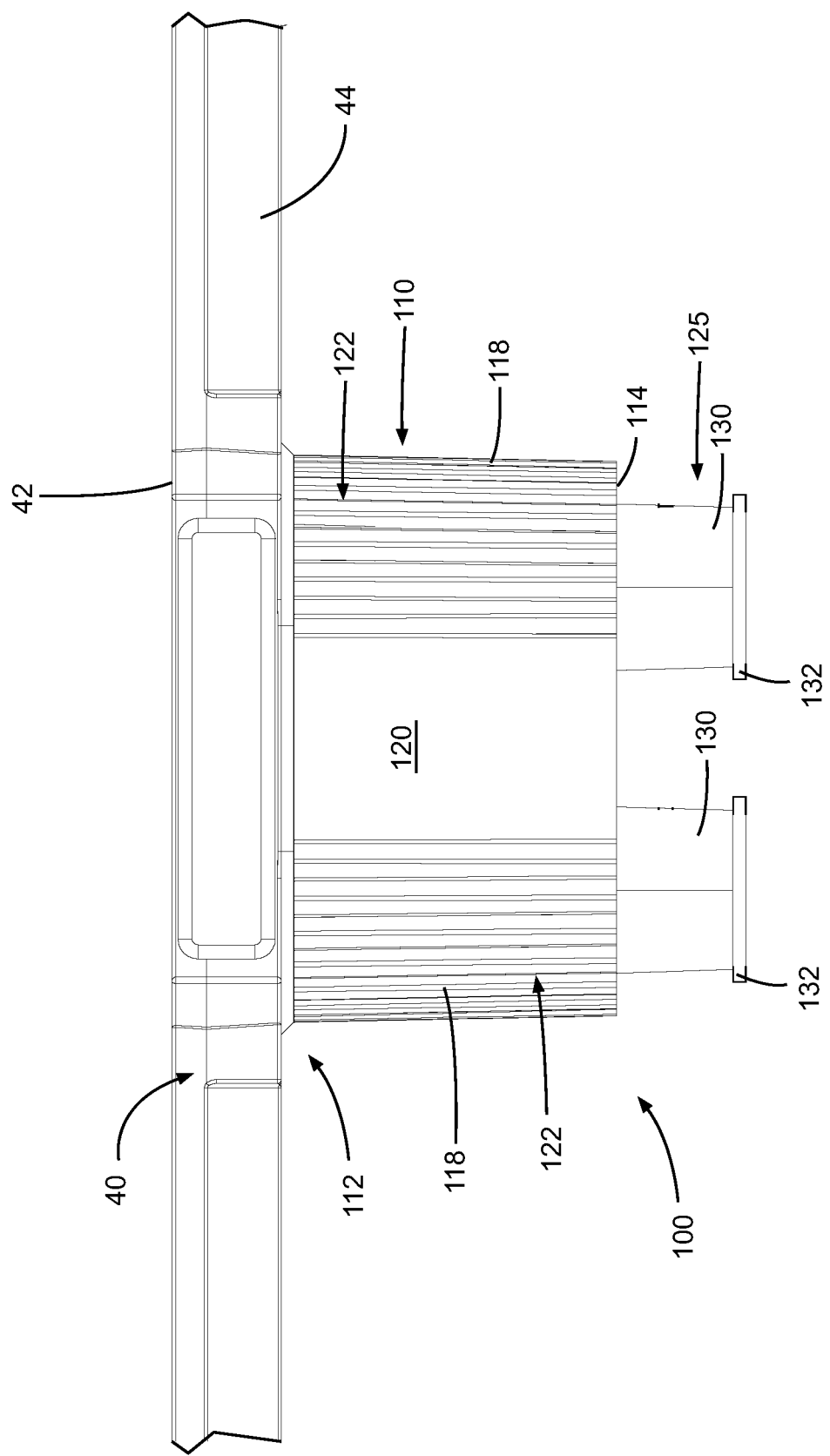
FIG. 12 is a front elevational view of a block of the support assembly of FIG. 3 as shown in FIG. 11.
Figure 13:
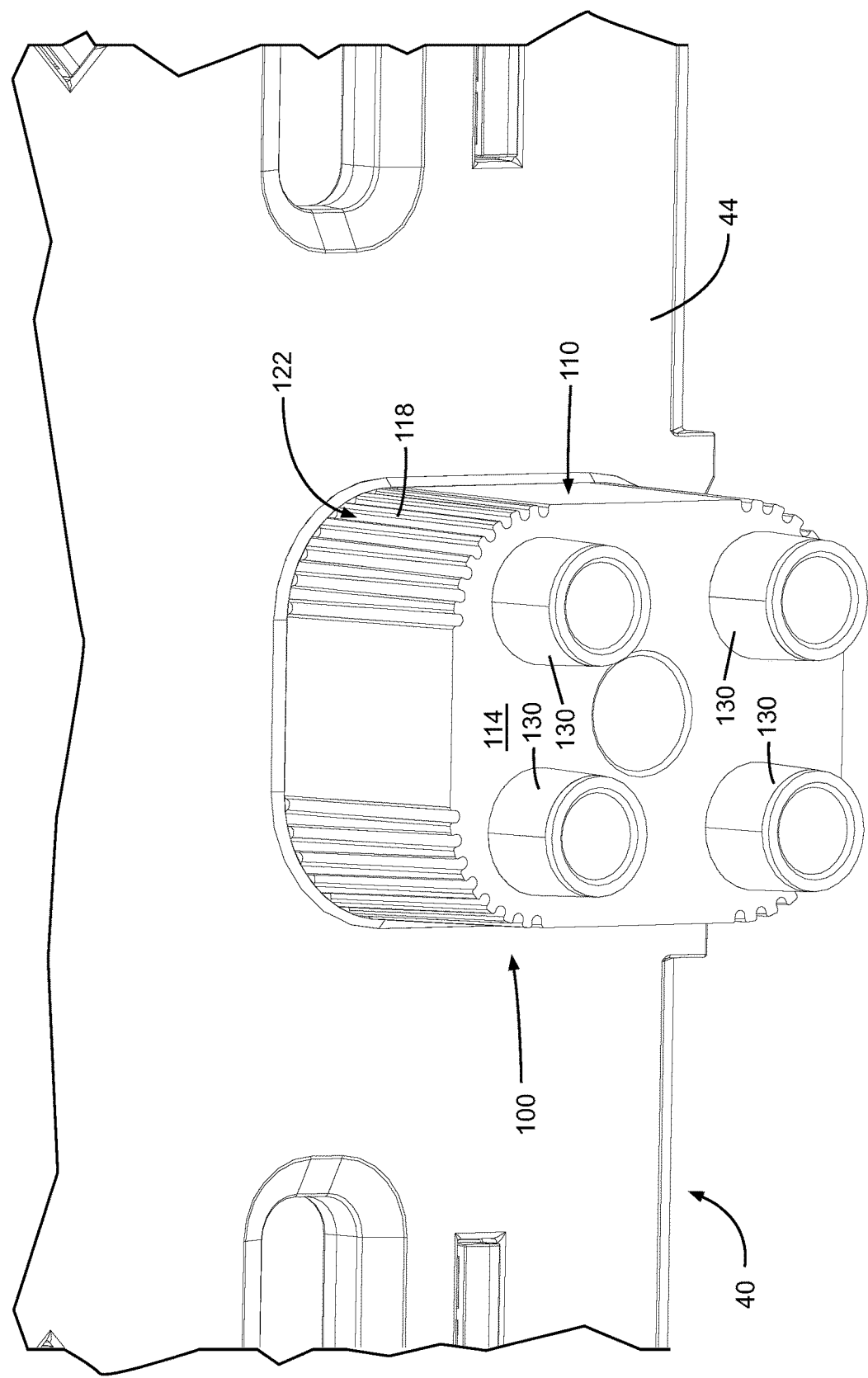
FIG. 13 is a bottom perspective view of the block of FIG. 12 as shown in FIG. 10.

An embodiment of a block 100 is shown in FIG. 12. Block 100 includes a body portion 110 and an extension portion 125 that includes extensions 130. As shown in FIG. 13, each block 100 may include multiple extensions 130. A bottom portion of extension 130 may include a projection 132 that extends radially from extension 130. Projection 132 may have an outer diameter that is larger than the outer diameter of other portions of extension 130.

Block 100 is integrally and unitarily formed with deck 40 to form support assembly 35. A top portion 112 of body portion 110 extends from deck 40 at lower surface 44. Body portion 110 has a width that is greater than the width of extension portion 125. Body portion 110 includes a bottom surface 114 between body portion 110 and extension portion 125.

In some embodiments, body portion 110 may have a rectangular shape with rounded corners 118. A planar side portion 120 is positioned between rounded corners 118. A series of parallel vertical grooves 122 may extend along body portion 110. In some embodiments, these grooves 122 may be found only on rounded corners 118, while side portion 120 does not have grooves 122. In some embodiments, grooves 122 may extend substantially the entire distance from the top edge of block 100, near top portion 112, to the bottom edge of block 100 adjacent bottom surface 114.

Body portion 110 may be made of a resilient material, so that grooves 122 allow body portion 110 to deform upon impact, for example from a fork of a fork lift and to recover to its original shape afterward. The rounded corners 118 of body portion 110 are the most likely to be contacted by an object such as a fork from a forklift, so grooves 122 are more likely to provide a benefit when positioned on rounded corners 118. Grooves are not as beneficial on other areas of body portion 110 that are less likely to be contacted by a fork, such as planar side portion 120. Some embodiments may include grooves 122 on these portions of body portion 110, but other embodiments may omit grooves 122 on side portions 120.

In some embodiments, block 100 may provide a surface for application of a hot stamp foil. The hot stamp foil may be used for identification or for other desired forms of decoration. As an example, the planar side portion 120 of block 100 may be a suitable area for application of hot stamp foil.

Figure 16:
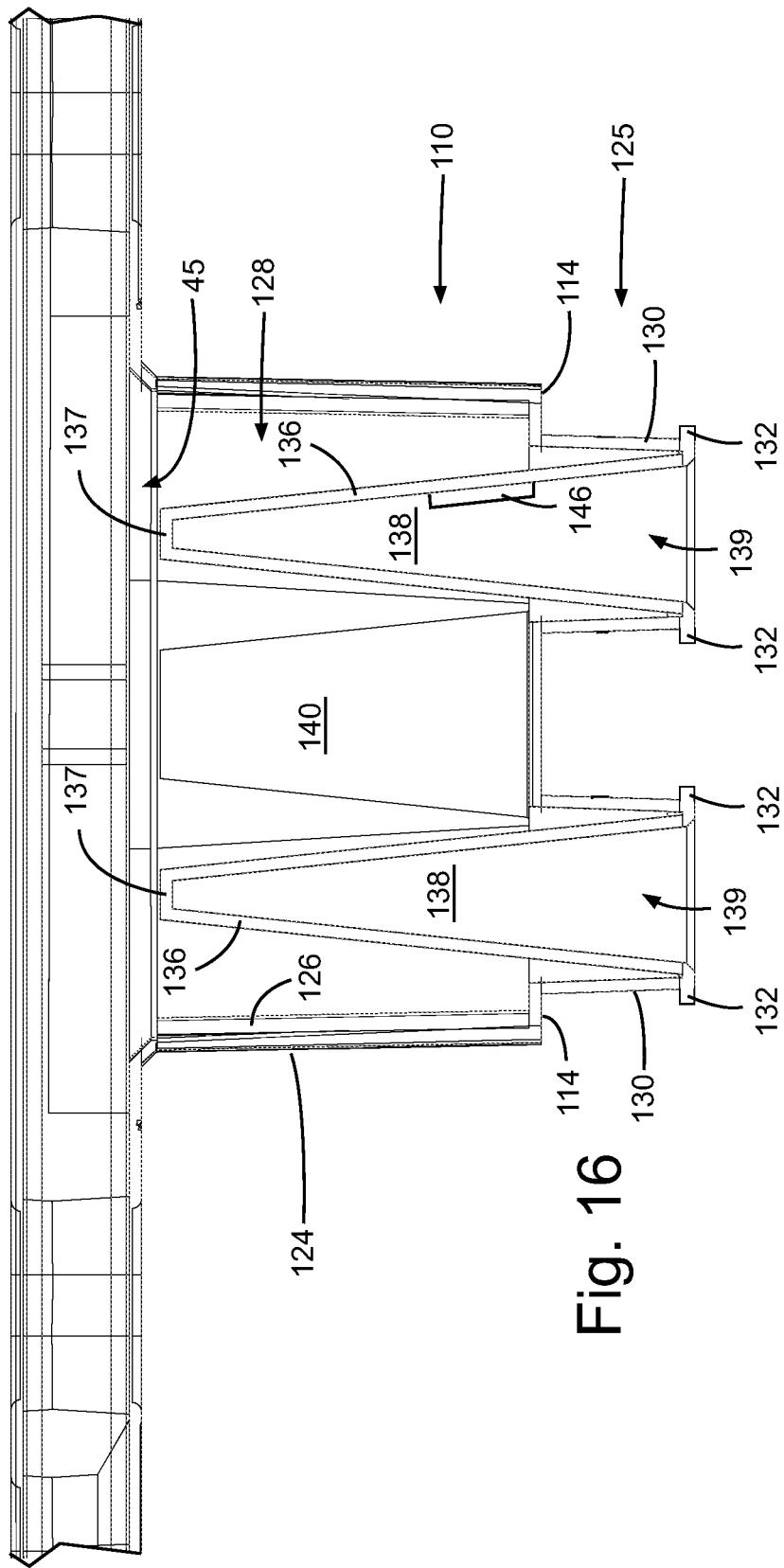
FIG. 16 is a cross-sectional front elevational view a portion of FIG. 14.

A cross-sectional view of block 100 is shown in FIG. 16. Block 100 includes an outer surface 124 and an inner surface 126 surrounding an interior 128. Because blocks 100 and deck 40 are integrally formed, interior 46 of deck 40 and interior 128 of blocks 100 form a continuous, shared internal cavity 45 between deck 40 and blocks 100. The support material that fills interior 46 for deck 40 also fills interior 128 of block 100 with the support material defining a unitary body made of a single piece. This support material may be a mixture of both plastic and non-plastic materials. The support material may be more rigid than the material used to form the outer shell of blocks 100 and deck 40.

Extension portion 125 includes one or more extensions 130 that extend past bottom surface 114 of body portion 110. Block support members 136 are molded with the outer surfaces of block 100 and may extend from extension 130 into interior 128 of block 100. Top surfaces 137 of block support members 136 are positioned in the shared internal cavity 45 between deck 40 and blocks 100 and may provide additional load bearing capacity and compressive strength when a load is placed over a block 100 while removing material from cavity 138, thereby reducing the weight of body portion 110 compared to a body portion 110 without cavity 138.

An opening 139 defined in the bottom of block support members 136 provides access to cavity 138. In some embodiments, opening 139 may remain uncovered so that open cavity is accessible from the bottom of pallet assembly 20. In other embodiments, a cap may be attached to support member 136 to cover opening 139, preventing access to cavity 138. Example methods of attaching a cap to support member 136 include spin welding, ultrasonic welding and hotplate welding.

Additional means of support such as an internal support member 140 may also be found within interior 128 of block 100. In the embodiment shown, internal support member 140 is conical and extends the length of body portion 110 to a top surface of stringer 150. Support member 140 may define an internal void that further reduces the weight of pallet assembly 20.

In the embodiment shown, block support members 136 are cone shaped or shaped as a truncated cone and form a cavity 138 that is not filled with support material, which helps to reduce the weight of block 100. Other embodiments may include block support members 136 that have different shapes. For example, support members 136, 140 may have rectangular cross sections. Additionally, the shapes of block support members 136 may be different within the same block 100.

In some embodiments, a tracking device 146 may be housed within an open cavity 138 of block 100. Tracking device 146 may use RFID, Bluetooth, GPS or any other suitable communication method for relaying information from the pallet. As an example, the information provided by tracking device 146 may include location information such as a specified destination. Other information such as pallet identification may also be provided. In other embodiments, tracking device 146 may be located in other portions of pallet assembly 20 rather than open cavity 138 of block 100. For example, tracking device 146 may be installed within interior 46 of deck 40.

Figure 17:
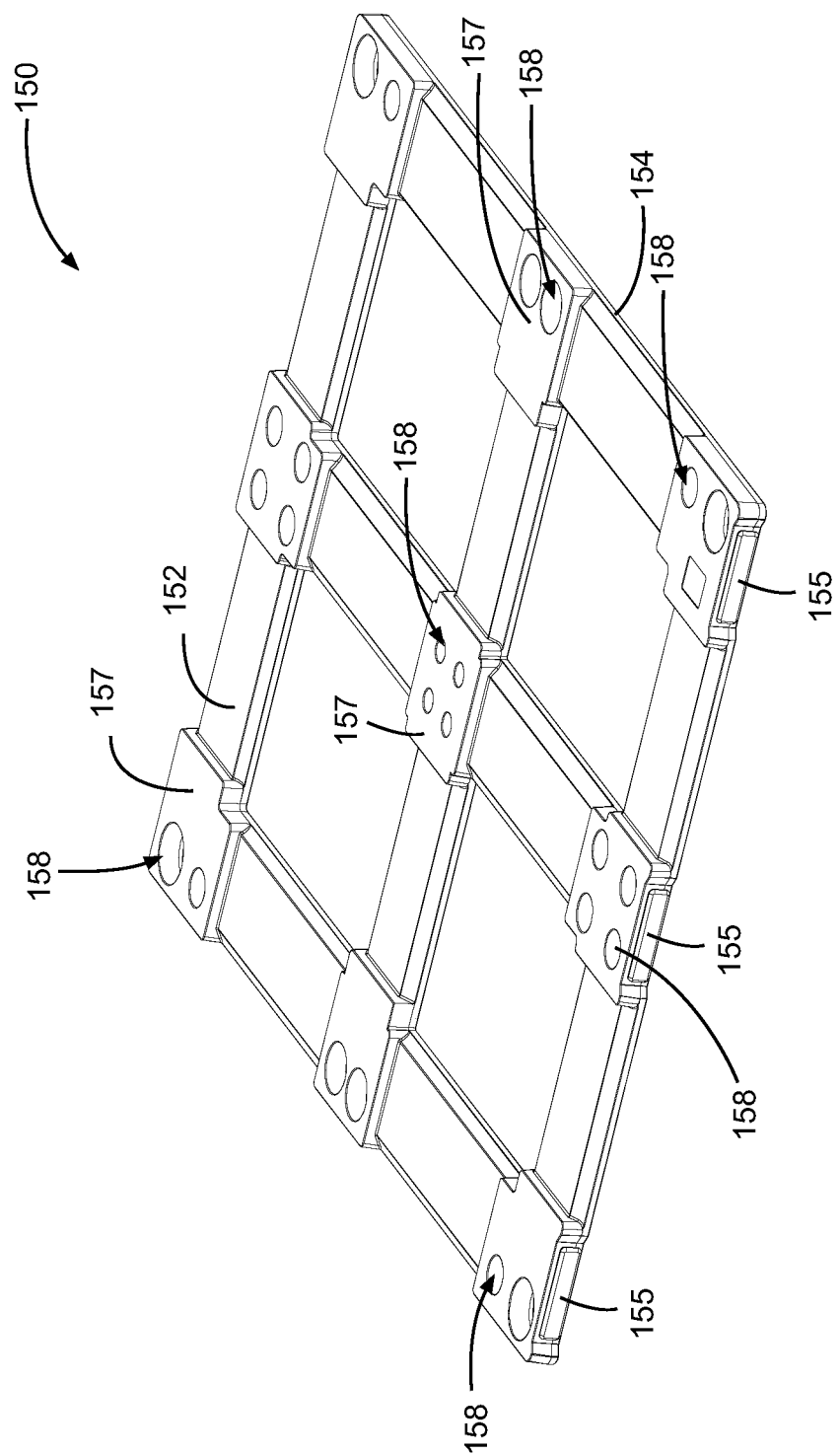
FIG. 17 is a perspective view of a stringer, a component of the pallet assembly of FIG. 1.
Figure 18:
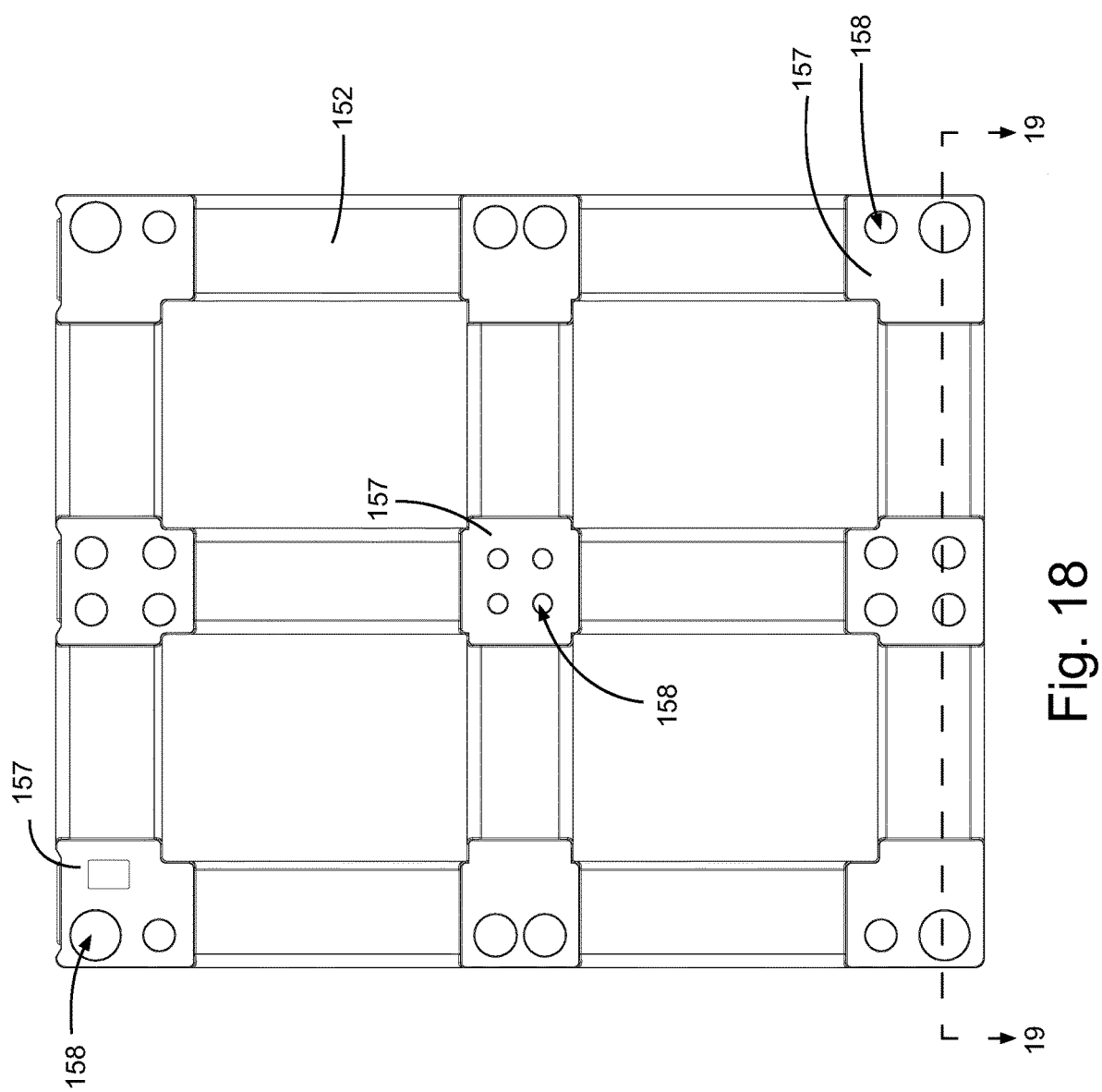
FIG. 18 is a top plan view of the stringer of FIG. 17.

Stringer 150 is shown in FIG. 17. Stringer 150 includes a top surface 152 and a bottom surface 154. Cavity 156 is defined between top surface 152 and bottom surface 154 (see FIG. 21). Stringer 150 includes block bases 157 and openings 158 defined through stringer 150 at a block base 157. Openings 158 extend through both top surface 152 and bottom surface 154 of stringer 150. As illustrated in FIG. 18, block bases 157 are positioned on stringer 150 to correspond to the position of blocks 100 on support assembly 35. Openings 158 are positioned on a block base 157 to correspond with the position of extensions 130 of the blocks 100.

Figure 20:
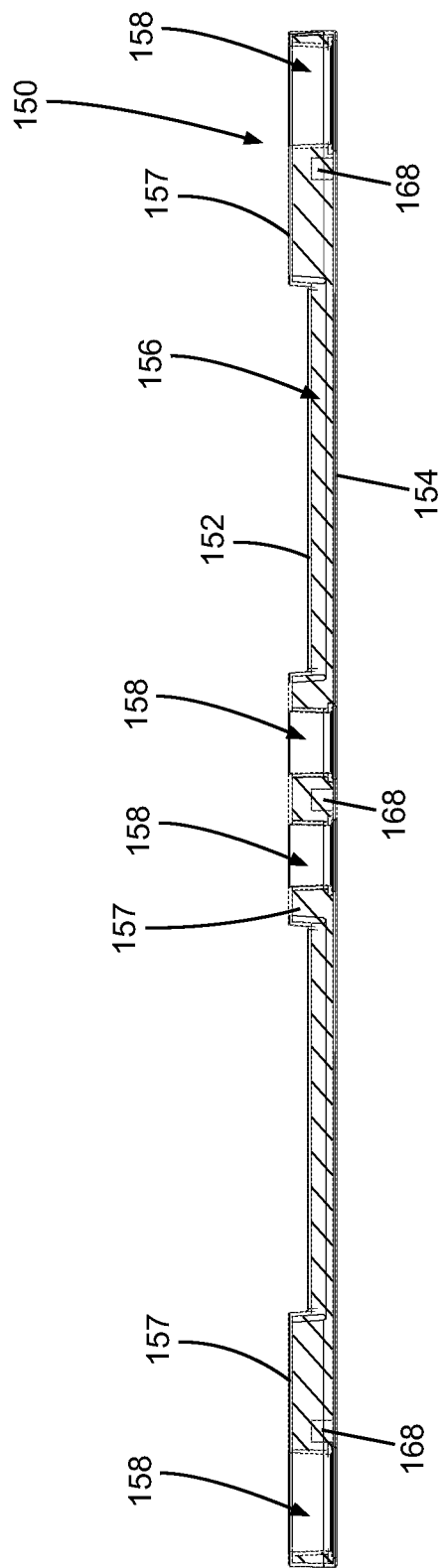
FIG. 20 is an alternative view of FIG. 19 highlighting the portions of the stringer that are filled with a support material.

Similar to the internal cavity 45 in support assembly 35, cavity 156 of stringer 150 is filled with a support material that gives stringer 150 increased strength and rigidity (see FIG. 20). The support material may be a plastic material mixed with additional non-plastic materials such as crushed minerals, silica sand, fibers, and/or porous materials such as pumice and flue ash.

Figure 19:
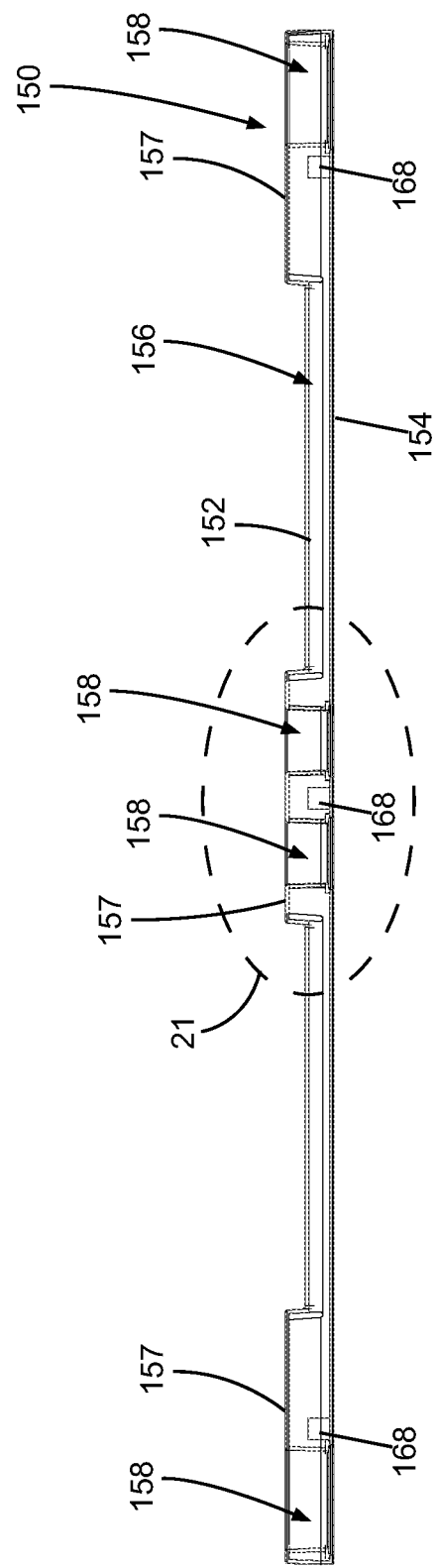
FIG. 19 is a cross-sectional front elevational view of the stringer of FIG. 17 taken along line 19-19 of FIG. 18.
Figure 21:
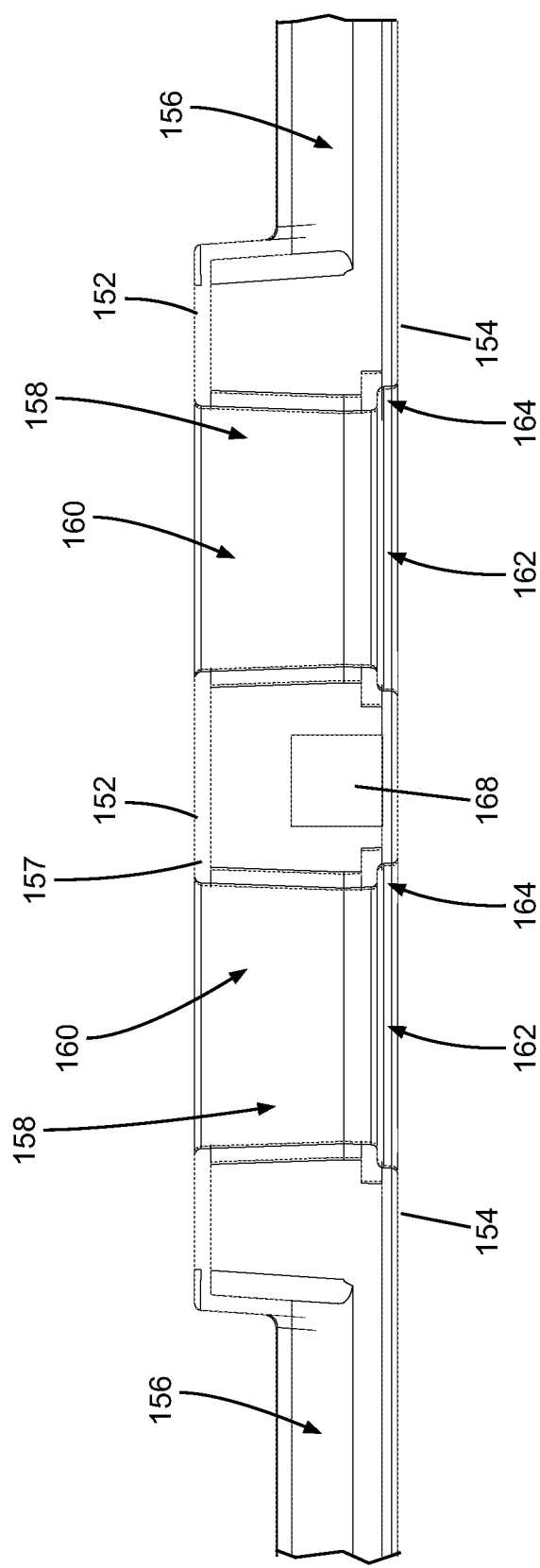
FIG. 21 is a cross-sectional front elevational view of a portion of the stringer of FIG. 17 as shown in FIG. 19.

In addition to support material, cavity 156 may also optionally include reinforcement members 168 that extend along the length or the width of stringer 150 that increase the strength of stringer 150 (see FIG. 19). As shown in FIG. 21, in some embodiments, reinforcement member 168 may be positioned between openings 158; however, in other embodiments reinforcement member 168 may be positioned on either side of openings 158. Additionally, reinforcement member 168 has a square cross-section in the embodiment shown, but in other embodiments, the shape of reinforcement member 168 may be varied. For example, reinforcement member 168 may have a circular cross-section, hexagonal cross-section, I-shaped cross-section, or any other suitable shape.

Similar to support assembly 35, stringer 150 includes fill ports 155 that provide access to cavity 156 of stringer 150. In some embodiments, fill ports 155 may be positioned on block bases 157. Insertable plugs may be used to close fill ports 155 when pallet assembly 20 is in use.

As shown in the partial view of the cross-section of stringer 150 in FIG. 21, openings 158 have a top portion 160 near top surface 152 and a bottom portion 162 near bottom surface 154. An interlock recess 164 extends radially outward from bottom portion 162 of each opening 158. Interlock recess 164 corresponds to projection 132 of an extension 130 and is configured to receive projection 132 when an extension 130 is inserted into opening 158.

Figure 22:
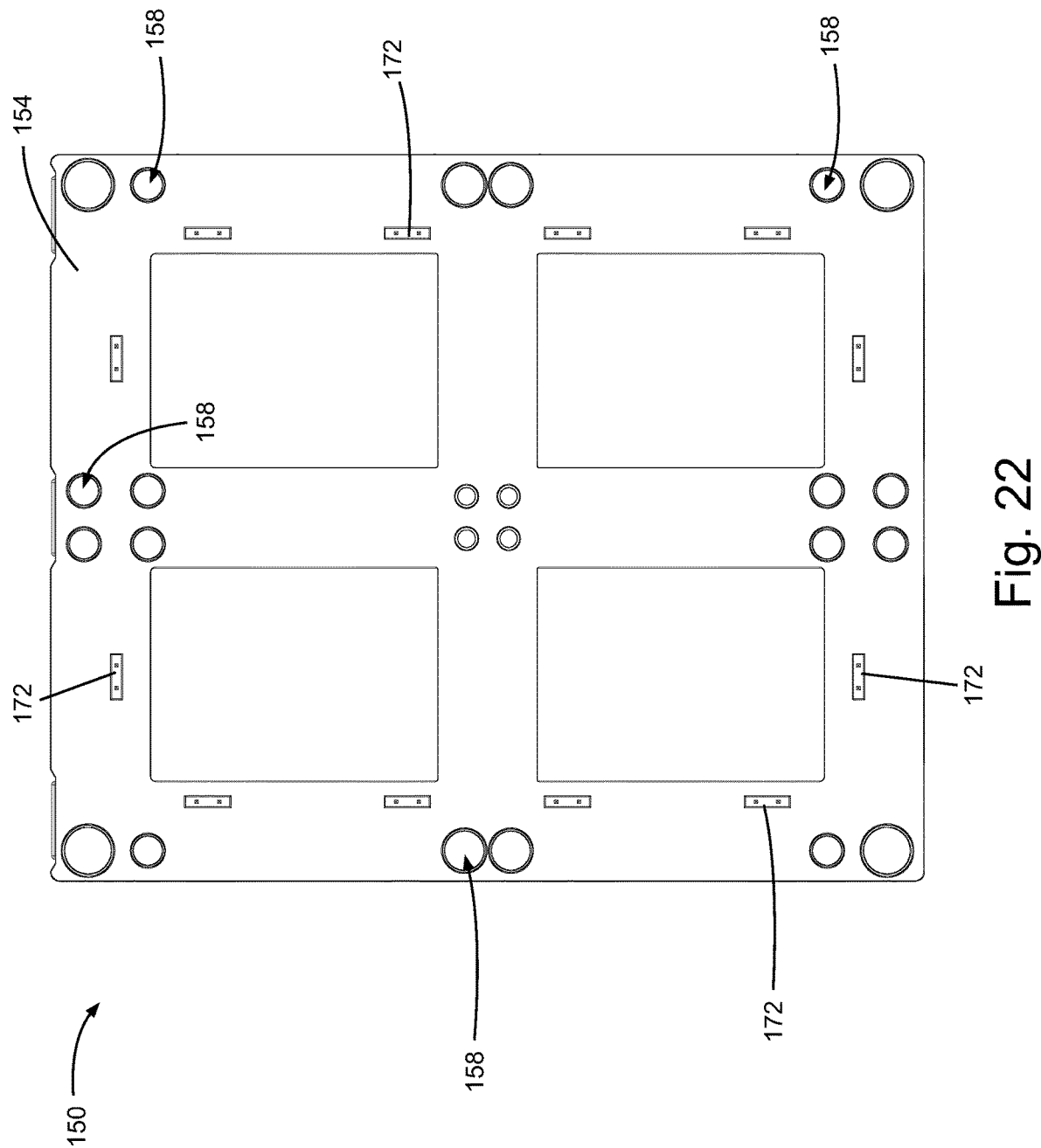
FIG. 22 is a bottom plan view of the stringer of FIG. 17.

A bottom view of stringer 150 is illustrated in FIG. 22. Openings 158 extend completely through bottom surface 154. Recesses 172 are also defined in bottom surface 154. Recesses 172 are positioned on bottom surface 154 to correspond with the position of at least a portion of the insert apertures 54 in support assembly 35.

Figure 23:
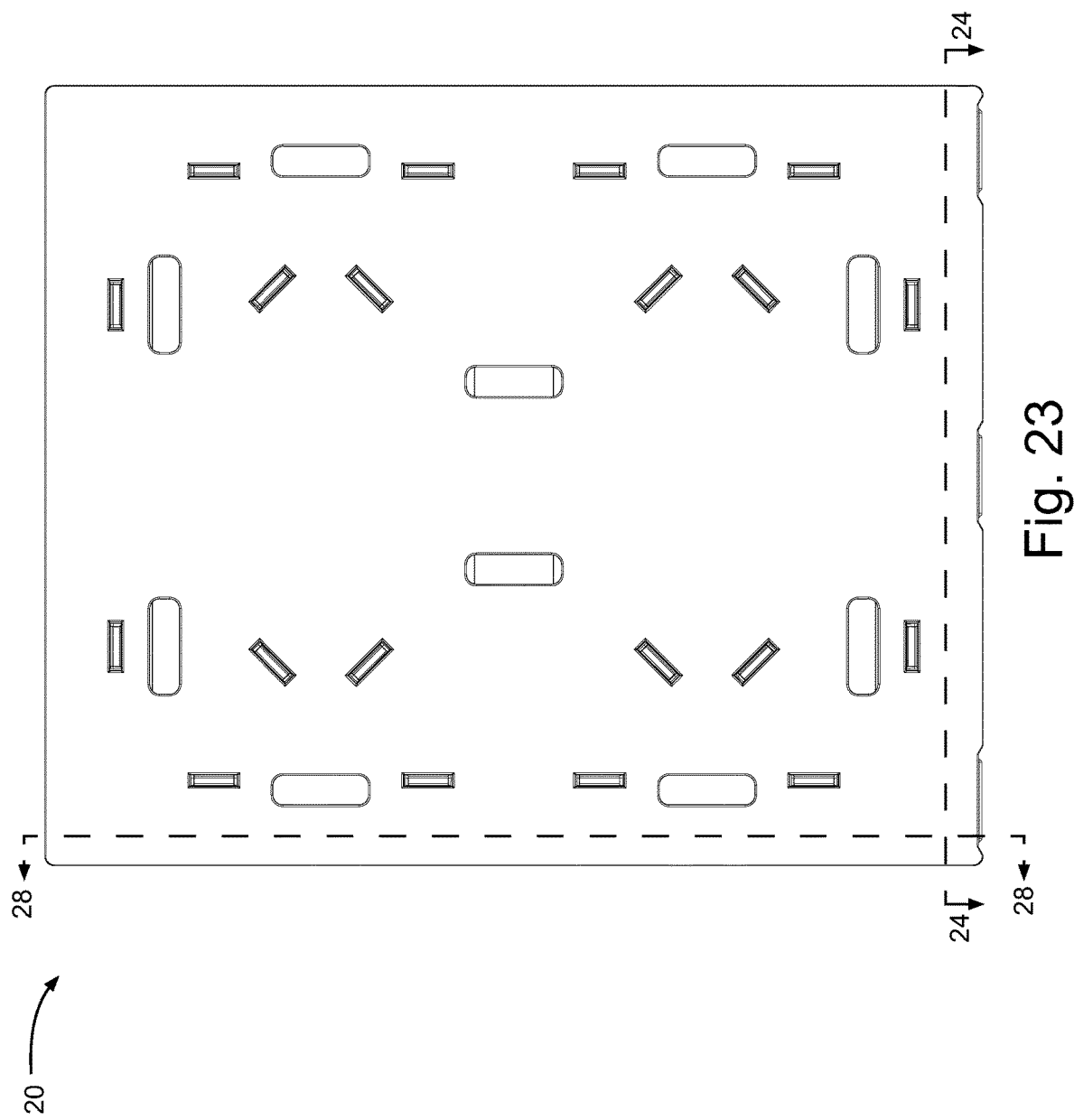
FIG. 23 is a top plan view of the pallet assembly of FIG. 1.
Figure 24:
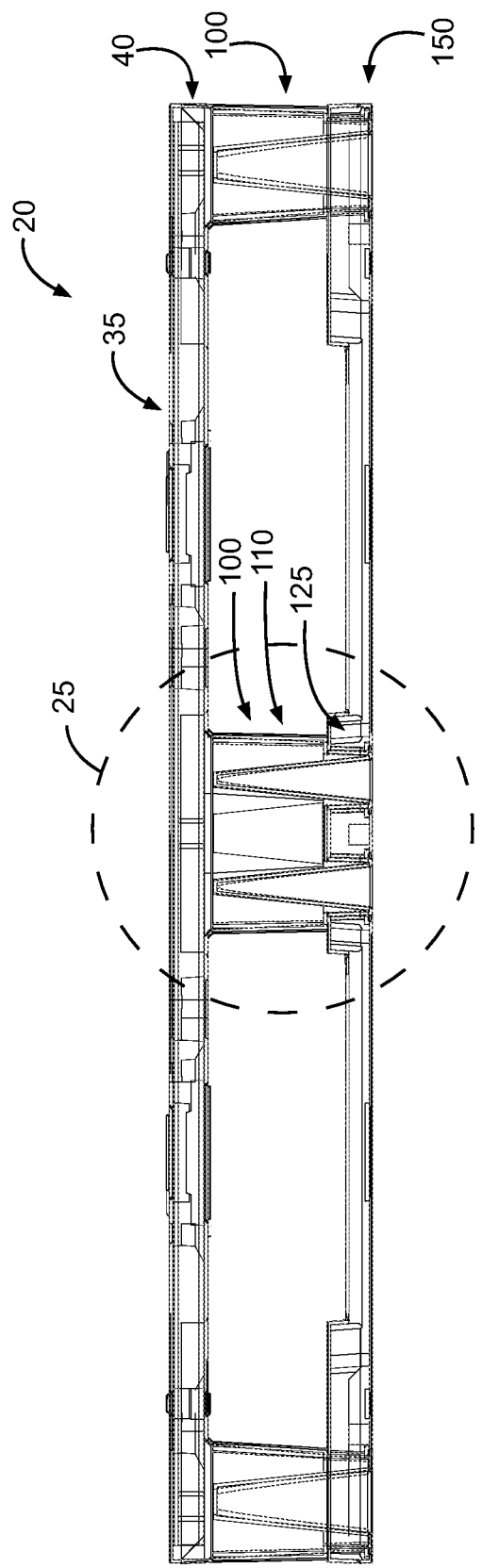
FIG. 24 is a cross-sectional front elevational view of the pallet assembly of FIG. 1 taken along line 24-24 of FIG. 23.
Figure 25:
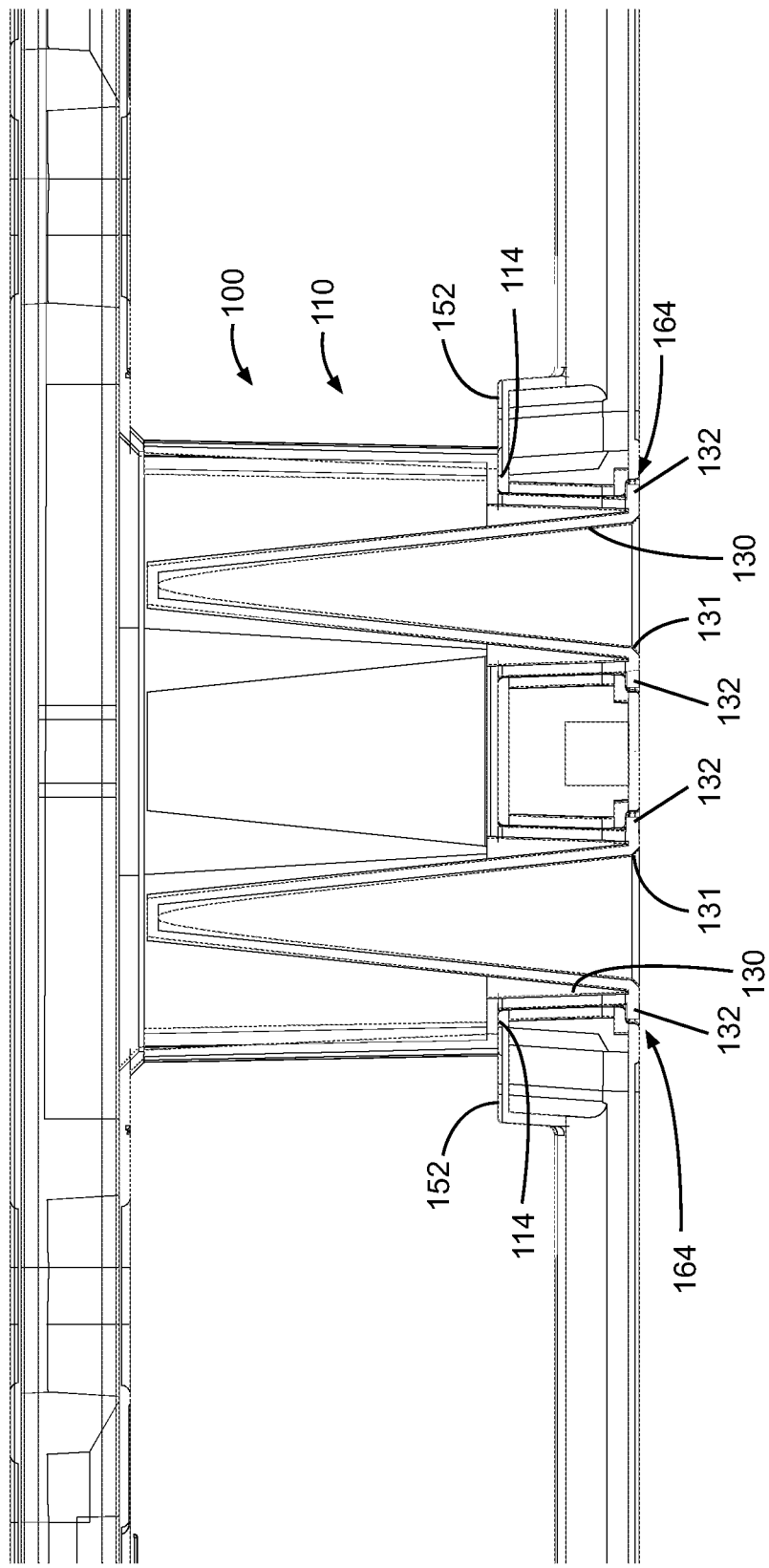
FIG. 25 is a partial cross-sectional front view of the pallet assembly of FIG. 1 as shown in FIG. 24.

A top view of pallet assembly 20 is shown in FIG. 23. To form pallet assembly 20 (see FIG. 1), support assembly 35 is positioned above stringer 150 so that deck 40 is substantially parallel to the stringer 150 (see FIG. 24). Support assembly 35 is oriented so blocks 100 are aligned with block bases 157, aligning extensions 130 of blocks with openings 158. As shown in FIG. 25, extensions 130 are inserted through corresponding openings 158, deforming projections 132 within opening 158 until extension 130 extends completely through opening 158, for the entire thickness of stringer 150. Therefore, when pallet assembly 20 is placed on the ground or another support surface, both the bottom surface 154 of stringer 150 and the bottom surface 131 of extensions 130 are in contact with the ground or support surface. This allows the load carried by support assembly 35 to be transferred directly from deck 40 to the support surface rather than through stringer 150.

Several features assist to keep support assembly 35 attached to stringer 150 once extensions 130 have been inserted into openings 158. When extension 130 enters into bottom portion 162 of opening 158, projections 132 are received in interlock recesses 164. Projections 132 have a larger outer diameter than the inner diameter of opening 158, so the interference between projections 132 and the walls of stringer 150 defining opening 158 helps resist stringer 150 from being pulled off of blocks 100, away from deck 40. Additionally, when extension 130 is positioned within opening 158, bottom surface 114 of block 100 rests on top surface 152 of stringer 150. Bottom surface 114 blocks stringer 150 from being pushed upward, into deck 40.

In addition, blocks 100 may optionally be welded to stringer 150 after extensions 130 have been positioned in openings 158 to help keep support assembly 35 attached to stringer 150. As an example, blocks 100 may be spin welded to stringer 150; however, other embodiments may use different kinds of welds, such as ultrasonic welding or hot plate welding.

Figure 26:
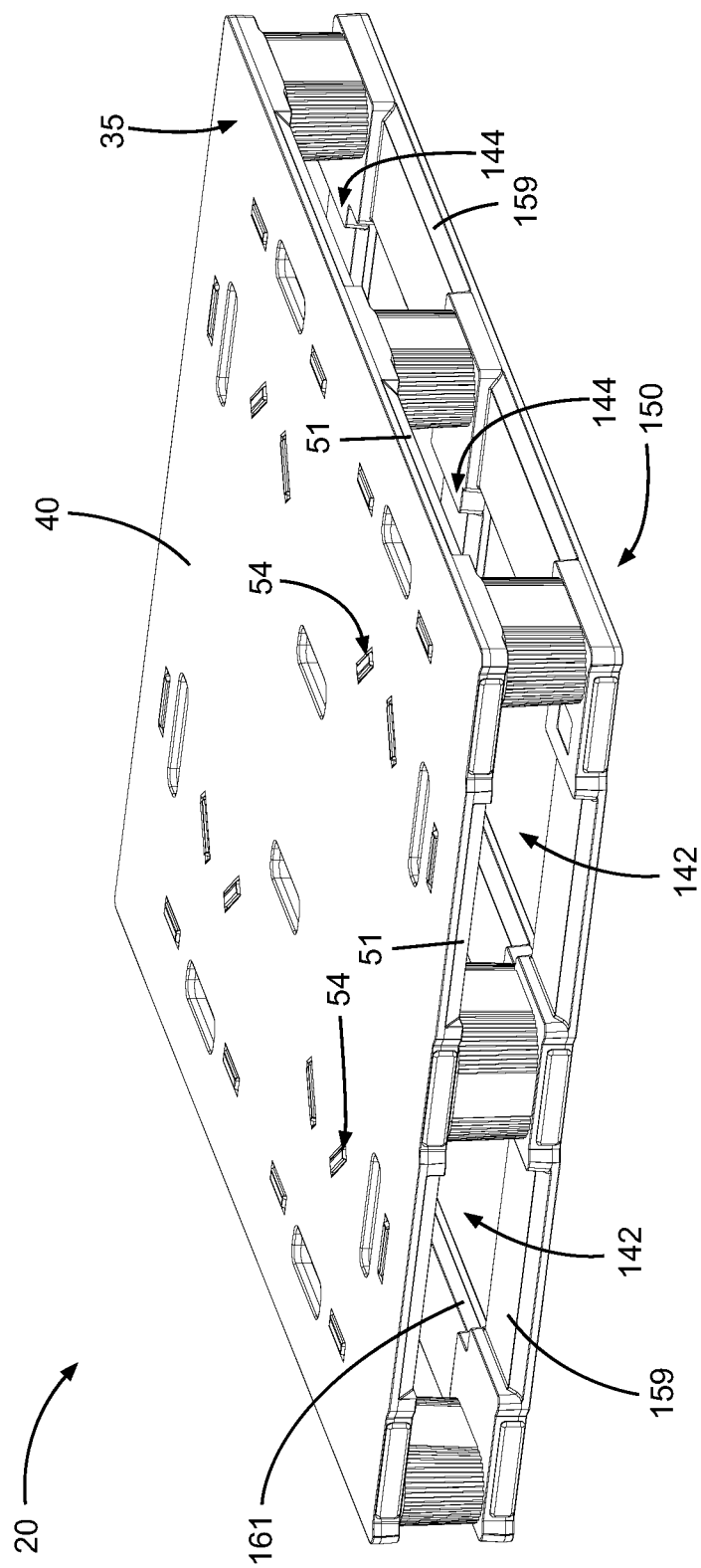
FIG. 26 is a perspective view of the pallet assembly of FIG. 1.
Figure 27:
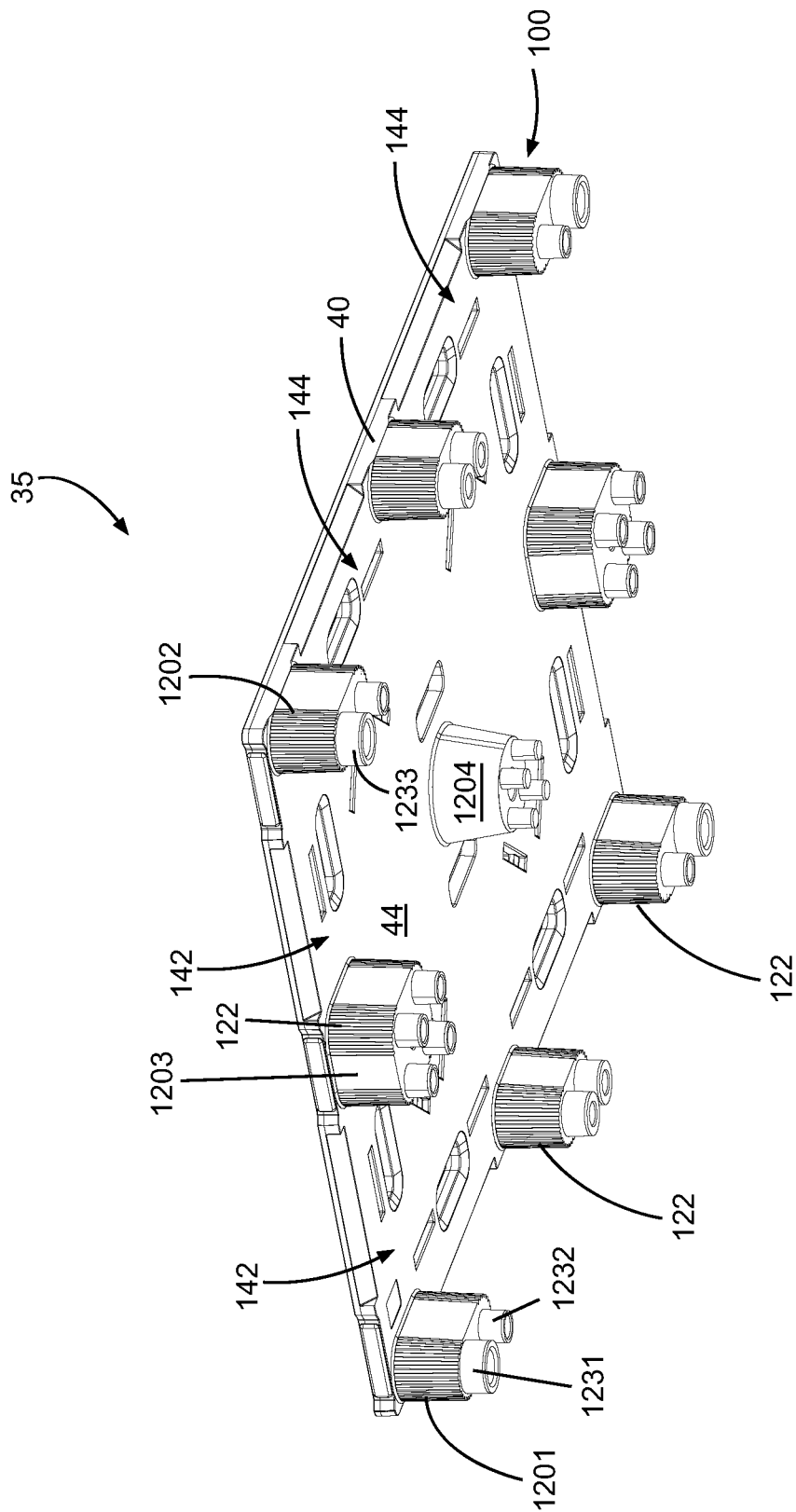
FIG. 27 is a bottom perspective view of the support assembly of FIG. 3.

FIGS. 26-27 illustrate an embodiment of support assembly 35 that includes a total of nine blocks 100. In the embodiment shown, the blocks are evenly distributed across the lower surface 44 of deck 40 with three rows of three blocks. Blocks 100 are spaced at a width from each other to create two gaps 142, 144, that extend the length of support assembly 35. The width of gaps 142 is large enough so that each gap 142 may receive a fork of a forklift or a pallet jack. In some embodiments, additional gaps 144 between blocks on an adjacent edge of support assembly 35 may also be wide enough to receive a fork of a forklift, allowing pallet assembly 20 to be picked up from any of the four sides of pallet assembly 20.

As shown in FIG. 26, insert apertures 54 may be positioned approximately midway between adjacent blocks 100 in gaps 142, 144 so that a fork inserted through gaps 142, 144 will contact a resilient insert 60 inserted in insert apertures 54. When a fork is raised to lift pallet assembly 20, the fork will contact and compress resilient inserts 60 rather than applying the entirety of its force on lower surface 44. This may increase the friction between support assembly 35 and the forks.

Deck 40 may include chamfers 51 positioned above gaps 142, 144 to guide a fork from a forklift into gap 142 or 144. Similarly, stringer 150 may also include chamfers 159 to further guide a fork from a forklift or a hand truck into gap 142 or 144. The wheels from a hand truck are able to roll over chamfers 159 so that the forks from the hand truck may be positioned beneath deck 40. In some embodiments, chamfers 159 on the exterior side of stringer 150 may be angled differently from chamfers 161 on the interior side of stringer 150. For example, interior chamfers 161 may have a steeper angle than exterior chamfers 159, making it more difficult to remove the hand truck from beneath deck 40 in the event that pallet assembly 20 slips on the hand truck. In other embodiments, exterior chamfers 159 may be steeper than interior chamfers 161 or exterior chamfers 159 may have the same angle as interior chamfers 161.

The configuration of individual blocks 100 may vary depending on the position of the block on deck 40. For example, as shown in FIG. 27, blocks 1201 and 1202 positioned at the corners of deck 40 may be smaller than a block 1203 positioned at the middle of the edge of deck 40. The other blocks in the same edge rows as blocks 1201, 1202 may also be smaller, similar to blocks 1201, 1202, while the blocks in the middle row may be larger, similar to block 1203. Because of their smaller size, the smaller blocks 1201, 1202 may only have two extensions 130 compared to the bigger block 1203, which may have four extensions.

Similar to the differing size of the blocks 100, the extensions 130 from blocks 100 may also be different sizes. The size of extensions 130 may vary from block to block, or the size of extensions 130 on the same block may even be different. In some embodiments, the extensions 130 located at the corners of deck 40 may be larger than extensions 130 of blocks at other locations along deck 40. For example, as shown in FIG. 27, extension 1231 of block 1201 is larger than extension 1232 on block 1201 and also larger than the extensions on block 1203.

FIG. 27 only shows one possible embodiment of a support assembly 35. Other embodiments of support assembly 35 may contain any other desired arrangement of blocks 100 and extensions 130. For example, bigger blocks may be positioned at the corners of deck 40, or in some embodiments, each of the blocks may be the same size. Likewise, in some embodiments each of the blocks may have the same number of extensions or the size of the extensions may be the same for each block. Some embodiments may also contain blocks that do not include extensions, but merely rest on top surface 152 of stringer 150 and provide additional load support without providing an attachment to stringer 150.

Still other embodiments of pallet assembly 20 may include fewer blocks or more blocks as desired. As an example, support assembly 35 may include four or five blocks, or support assembly 35 may have twelve blocks. Additionally, other embodiments may have a different arrangement of blocks 100 rather than being evenly distributed along deck 40. For example, blocks 100 may be arranged so there is a greater density of blocks one half of deck 40 and a smaller density on the other half of deck 40.

Figure 28:
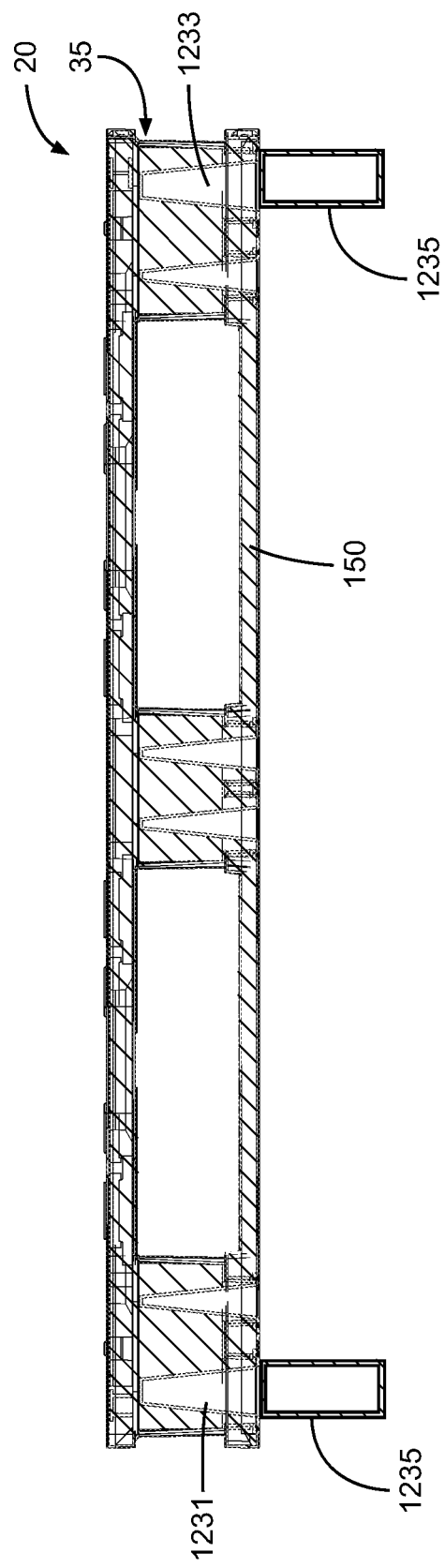
FIG. 28 is a cross-sectional side elevational view of a pallet assembly supported by a warehouse rack.

In some embodiments the dimensions of pallet assembly 20 may be determined based on a standard warehouse racking width. For example, some standard pallets may be 40 inches (1.02 m) by 48 inches (1.22 m), and standard warehouse racks are sized to accommodate this size of pallet. Blocks 100 may be positioned on pallet assembly 20 so that pallet assembly 20 can be aligned with a warehouse rack, so that extensions 130 of blocks 100 rest on the frame of the warehouse rack. For example, in FIG. 28, the distance between extension 1231 and extension 1233 is equal to the standard distance between the frames 1235 of rack in a warehouse so that extensions 1231, 1233 are positioned directly above the frames 1235 of the rack.

FIG. 27 also shows one possible arrangement of grooves 122 on blocks 100. In this arrangement, grooves 122 are included on the rounded corners of each of the blocks 100 positioned along the edges of deck 40. Middle block 1204 optionally does not include grooves 122. As a the fork from a forklift is inserted through a gap 142 or 144, the most likely portion of the block to get struck by the fork would be one of its corners as the fork is inserted into gap 142 or 144. Therefore, it may be desirable to have grooves on this portion of the block to protect the block from damage. Additionally, the ribs defined between grooves 122 create a thicker wall (for the same weight of material) which may provide a warning system to forklift drivers that they have not properly aligned the forks and will soon be piercing a block if they continue on the same entry. Since pallet assembly 20 is arranged to be lifted by a forklift from any desired edge, each of the outer blocks may be in line to be impacted by a fork being inserted through a gap 142 or 144.

As previously discussed, this is merely one possible arrangement of grooves 122 on blocks 100 of a support assembly 35. Other embodiments may include blocks without grooves, may include grooves on every block, or may include blocks that have body portions 110 that are completely covered in grooves 122.

Figure 29:
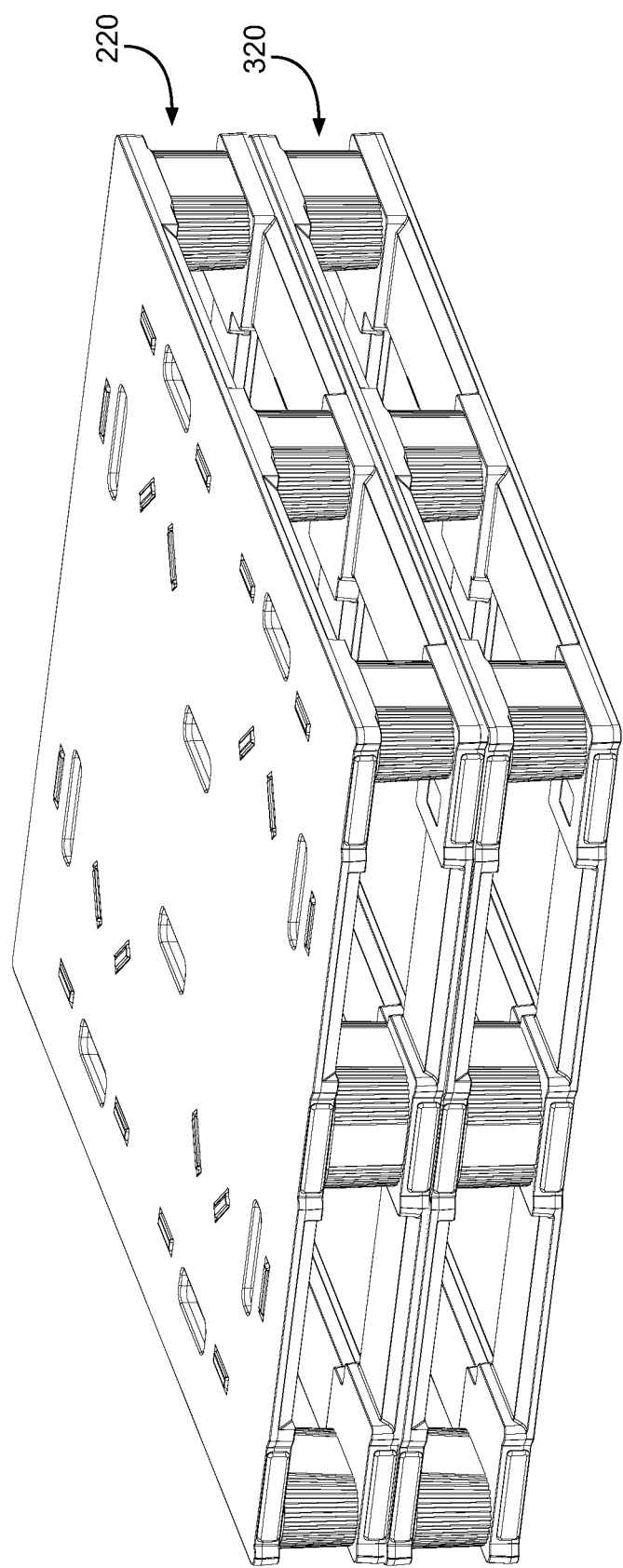
FIG. 29 is a perspective view of a first pallet assembly stacked on a second pallet assembly.
Figure 30:
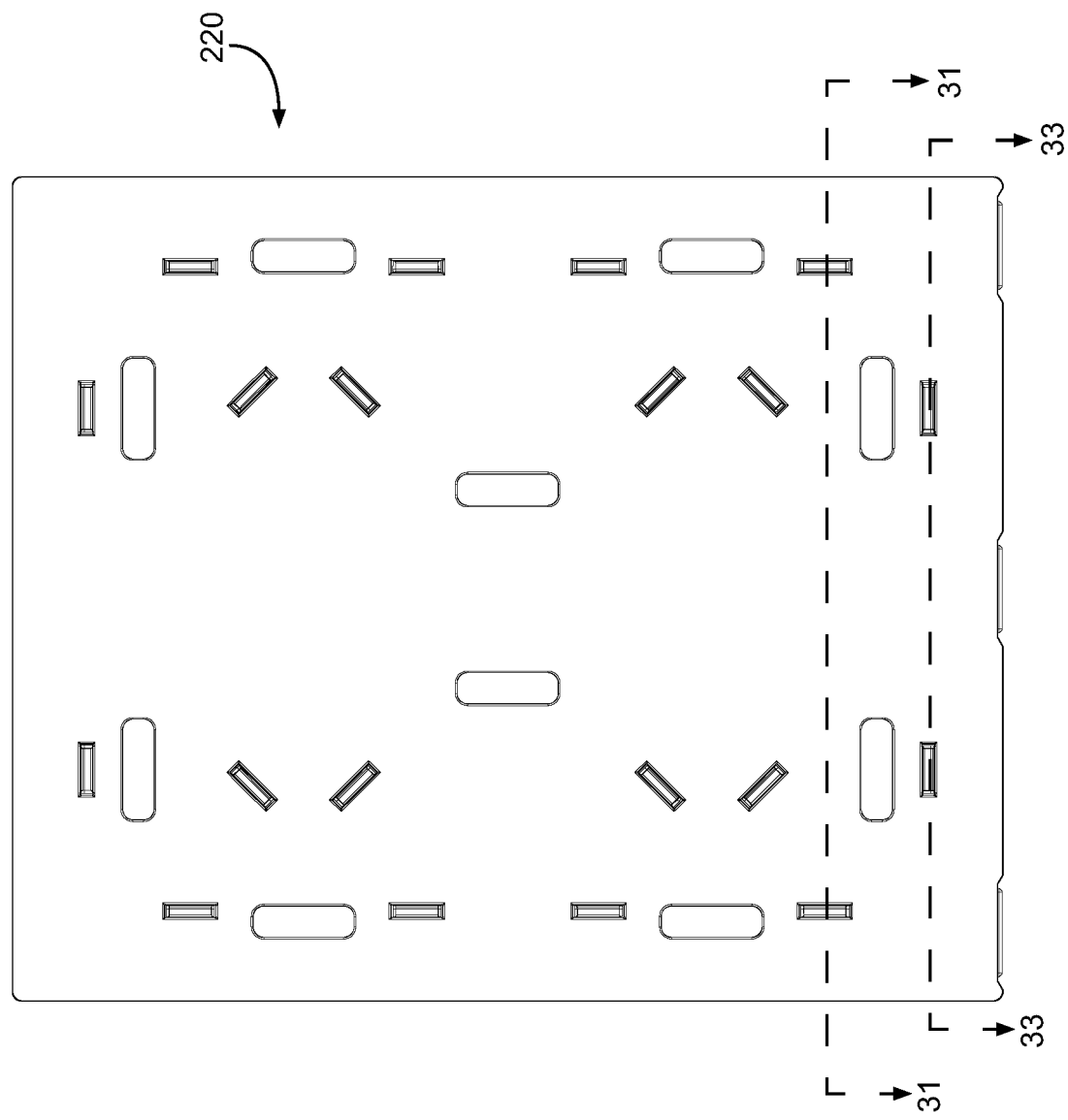
FIG. 30 is a top plan view of the stacked pallet assemblies of FIG. 29

As shown in FIGS. 29-30, pallet assemblies 25 are designed to be stackable for ease of transport and to reduce area necessary for storage. A first pallet 220 is placed directly on top of a second pallet 320 so that the stringer 150 of first pallet 220 is abutting the deck 40 of second pallet 320. When first pallet 220 is atop second pallet 320, blocks 100 align so that blocks 100 of first pallet 220 are directly above blocks 100 of second pallet 320.

Figure 31:
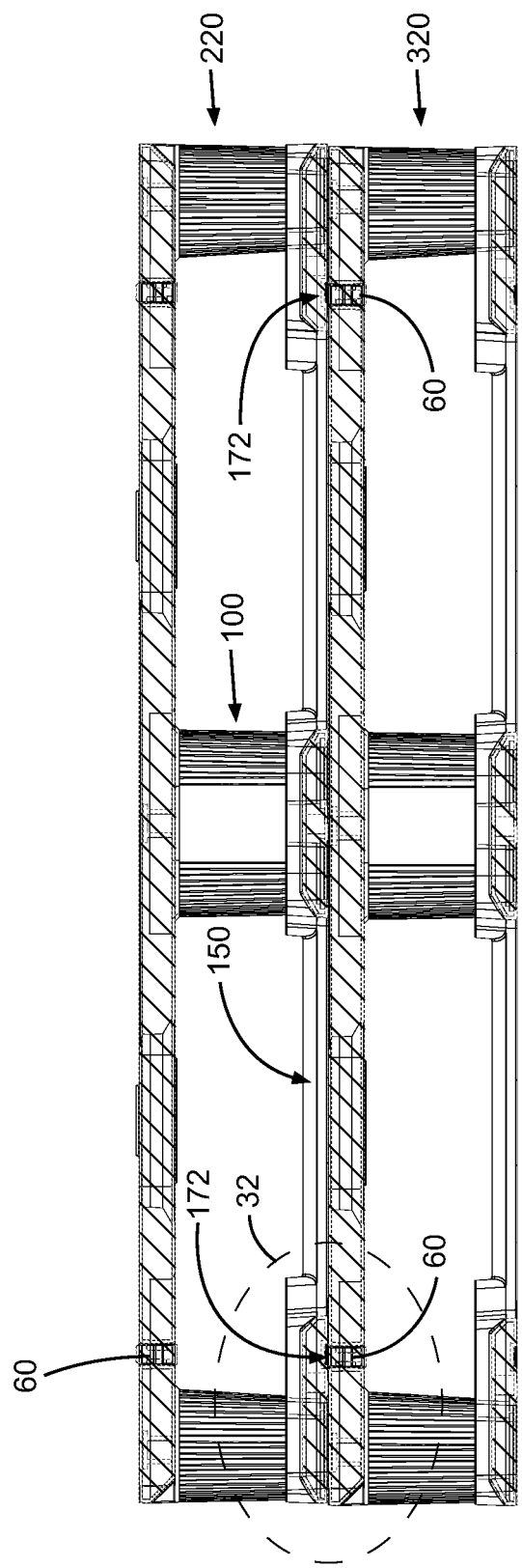
FIG. 31 is a cross-sectional front elevational view of the stacked pallet assemblies of FIG. 29 taken along line 31-31 of FIG. 30.
Figure 32:
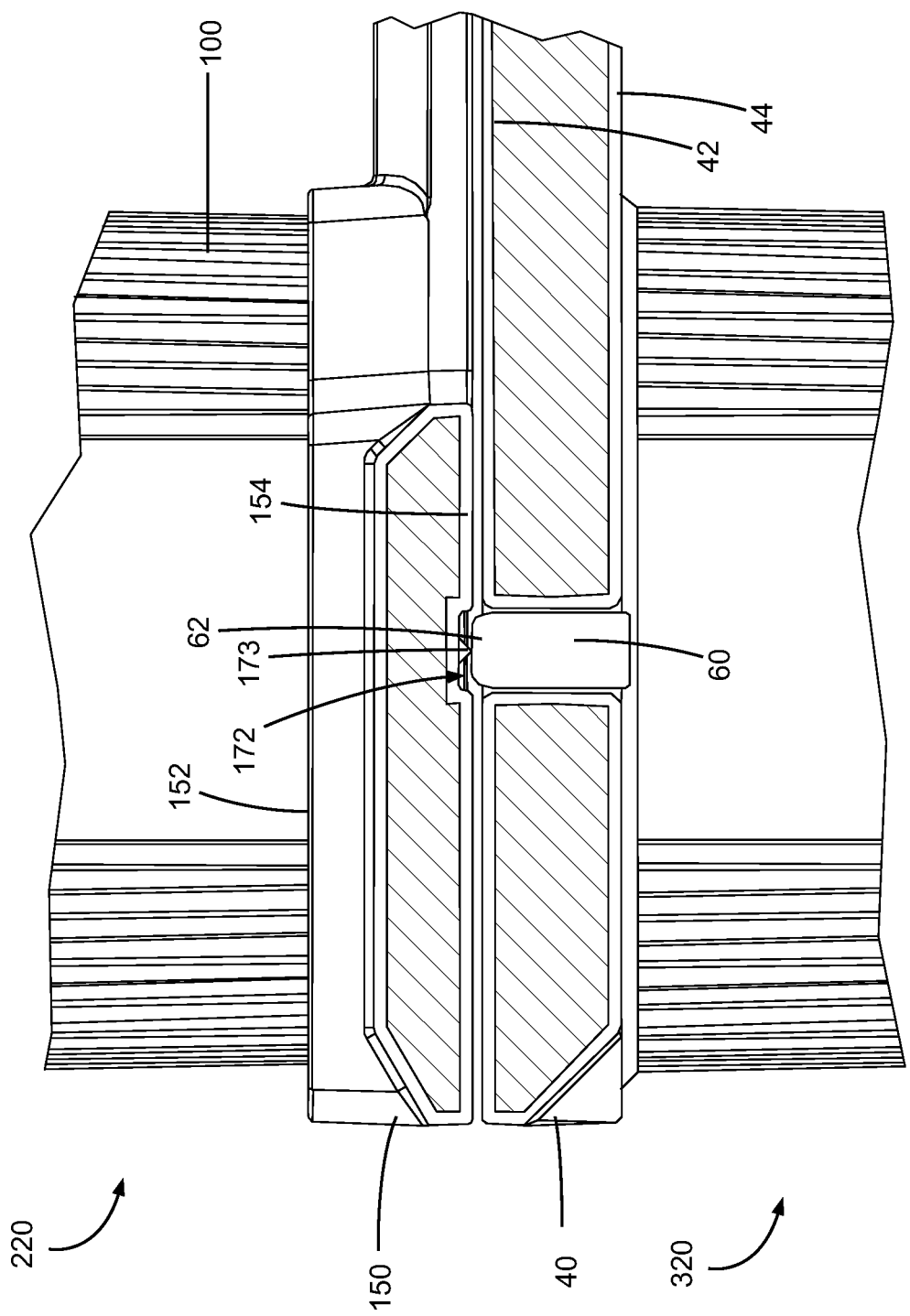
FIG. 32 is a partial cross-sectional front elevational view of the stacked pallet assemblies of FIG. 29 as shown in FIG. 31.
Figure 33:
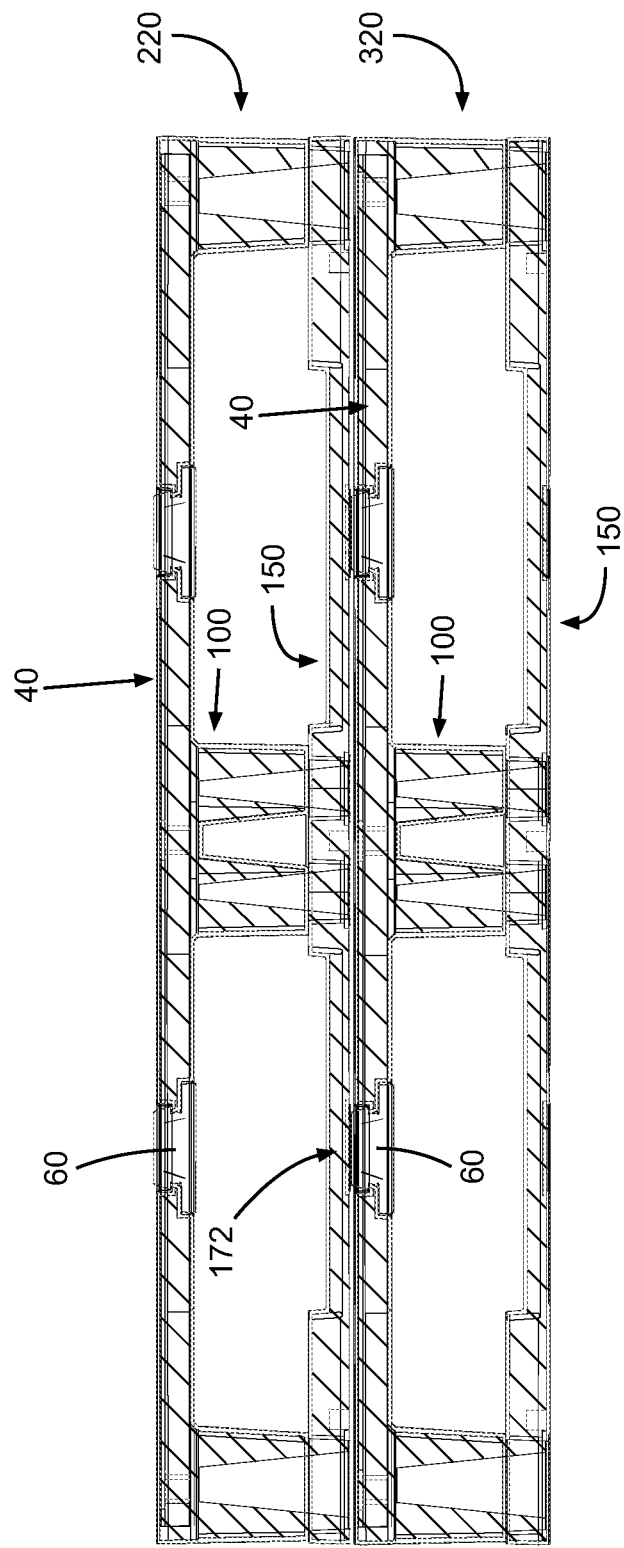
FIG. 33 is a cross-sectional front elevational view of the stacked pallet assemblies of FIG. 29 taken along line 33-33 of FIG. 30.
Figure 34:
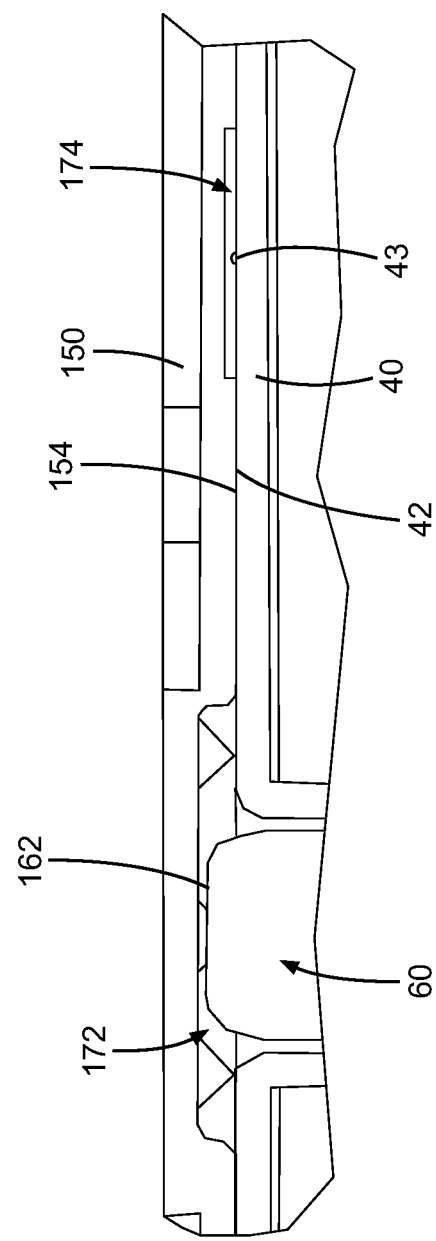
FIG. 34 is a partial cross-sectional front elevational view of the interface between a first pallet assembly stacked on a second pallet assembly.

Additionally, as shown in FIGS. 31-33, the recesses 172 of first pallet 220 are aligned with resilient inserts 60 of the second pallet 320, allowing upper faces 62 of resilient inserts 60 to be received within recesses 172 (see FIG. 34). This allows first pallet 220 to be stacked on second pallet 320 without a gap forming between the two pallets 220, 320 if the upper face 62 of insert 60 protrudes above upper surface 12. A projection 173 or a series of projections 173 may extend from recess 172 and interact with upper face 62 of a resilient insert 60 to increase frictional engagement between stacked pallets. Additionally, upper face 62 may produce friction between pallets 220, 320, for example between projection 173 and upper face 62, to help reduce movement of first pallet 220 relative to second pallet 320.

In some embodiments, upper surface 42 of deck 40 may include grip protrusions 43 that extend from upper surface 42 (see FIG. 34). Grip protrusions 43 may increase friction between deck 40 and a load placed on deck 40 and may also assist to prevent damage to the deck 40. Grip protrusions 43 may also correspond with grip indents 174 on the bottom surface 154 of stringer 150. When a first pallet 220 is stacked on top of a second pallet 320, the grip indents 174 from first pallet 220 align with the grip protrusions 43 of second pallet 320. The grip protrusions 43 and grip indents 174 can help to align the stacked pallets 220, 320 and also help provide additional resistance to help prevent the first pallet 220 from moving relative to the second pallet 320.

In some embodiments, grip protrusions 43 may be approximately 1 mm in diameter and approximately 0.5 mm in height. The spacing of grip protrusions 43 on deck 40 may be approximately 50 mm. Likewise, the corresponding grip indents 174 must have a diameter of at least 1 mm and a depth of at least 0.5 mm, so that grip indent 174 may receive a grip protrusion 43. However, these are representative dimensions. Other embodiments may have grip protrusions 43 with different diameters and different heights. Some embodiments may include different sized grip protrusions 43 on the same deck 4, as long as grip indents 174 correspond with the different sizes of the grip protrusions 43.

To manufacture pallet assembly 20, support assembly 35 and stringer 150 may be manufactured separately. In some embodiments, the unitary outer shell that forms support assembly 35 and the unitary outer shell that forms stringer 150 may be molded using rotational molding; however, any other suitable method of molding or other desired method of manufacturing may be used. A foaming agent may then be added to the outer shell. This foaming agent may comprise a mineral fill material, for example a silicate material such as sand, or a carbonate such as calcium carbonate. However, other suitable mineral fill material may also be used.

After forming the outer shell of the support assembly 35 and the stringer 150, a support material may be used to fill or partially fill the cavities 45, 156 of support assembly 35 and stringer 150. The support material may comprise a mixture of both plastic and non-plastic materials, and may be more rigid than the material that is used to form support assembly 35 and stringer 150. The support material is inserted into cavities 45, 156 through fill ports 50, 155. After the desired amount of support material has been added to cavities 45, 156, caps are placed over fill ports 50, 155 to prevent the support material from being removed from cavities 45, 156.

As previously discussed, the support assembly 35 and stringer 150 may be attached by fitting extensions 130 of blocks 100 into openings 158 of stringer 150. In some embodiments, support assembly 35 and stringer 150 may be attached using interference fits or friction fits, but in other embodiments, welding may be used to keep support assembly 35 attached to stringer 150. One possible method of welding that may be used is spin welding. Other type of welding that could be used includes ultrasonic welding or hot plate welding. If a pallet assembly 20 becomes damaged or has passed its useful life span, the entirety of pallet assembly 20 may be recycled. The recycled material from pallet assembly 20 may be used as the fill material of a new pallet assembly 20.

Clause 1: A pallet assembly comprising: a support assembly comprising a contiguous outer shell molded from a plastic shell material, wherein said outer shell is filled with a support material that comprises a mixture of both plastic and non-plastic materials and wherein said support assembly includes: a deck that has a upper surface and a lower surface; a plurality of blocks that extend away from the lower surface of said deck, each block including a body portion and an extension portion, wherein said plurality of blocks are unitarily formed with said deck such that said contiguous outer shell defines a common internal space that extends between said deck and said plurality of blocks, wherein the common internal space is filled with said support material; a stringer having a thickness, wherein said stringer defines a plurality of openings that each extend through the thickness of said stringer; and, wherein each extension portion of the plurality of blocks extends completely through an individual opening in said stringer and wherein said stringer is attached to said support assembly.

Clause 2: A pallet assembly comprising: a support assembly comprising: a deck that has an upper surface and a lower surface; a plurality of blocks that extend away from the lower surface of said deck, each block including a body portion and an extension portion, and wherein a particular extension portion further comprises a projection that extends away from said particular extension; a stringer positioned parallel to the deck of said support assembly, wherein said stringer defines a plurality of openings that each receive a corresponding one of said blocks of said support assembly; and, wherein a particular opening in said stringer that said particular extension extends through defines a recess adapted to receive said projection, wherein, when said projection is received in the recess, said projection and the recess resist removal of said particular extension portion from the particular opening and wherein said particular extension and said projection are adapted to deflect to pass through the particular opening when first inserting said particular extension through the particular opening.

Clause 3: A pallet assembly comprising: a support assembly including: a deck made from plastic; a plurality of blocks extending from said deck, wherein each of said blocks includes a body portion and an extension portion, and wherein a particular extension portion further comprises projection that extends away from said particular extension; a stringer positioned parallel to the deck of said support assembly, wherein said stringer defines a plurality of openings that each receive a corresponding one of said blocks of said support assembly; wherein a particular opening in said stringer that said particular extension extends through defines a recess adapted to receive said projection, wherein, when said projection is received in the recess, said projection and the recess resist removal of said particular extension portion from the particular opening and wherein said particular extension and said projection are adapted to deflect to pass through the particular opening when first inserting said particular extension through the particular opening; and a weld between said block including said particular extension and said stringer, wherein said weld attaches said block to said stringer so that said support assembly and said stringer are integral.

Clause 4: A pallet assembly comprising: a plastic deck, wherein said deck defines a cavity that is filled with a support material including a plastic and nonplastic mixture; a stringer positioned parallel to said deck; a plurality of blocks positioned between said deck and said stringer, wherein said plurality of blocks is unitarily formed with said deck to define a contiguous outer shell molded from a plastic shell material, wherein said outer shell defines a portion of the cavity that is filled with said support material; and wherein each block includes: a body portion and an extension portion, wherein said body portion connects to the deck and the extension portion connects to the stringer; an outer surface that defines a plurality of vertical grooves extending along said body portion; an inner layer, wherein said inner layer is interior of said outer surface; and, wherein the outer surface of each of said blocks is more resilient than the inner layer of each of said blocks.

Clause 5: A pallet assembly comprising: a support assembly including: a plastic deck including an upper surface and a lower surface, wherein said upper surface is substantially planar, wherein said deck defines a cavity filled with a support material that comprises a mixture of both plastic and non-plastic materials; a plurality of apertures defined in said deck, wherein said apertures extend through said upper surface; a plurality of blocks extending away from said lower surface of said deck; wherein said upper surface and said apertures extending through said upper surface define a support area; a stringer positioned parallel to the deck of said support assembly, wherein said plurality of blocks are attached to said stringer so that said stringer is connected to said support assembly; and, wherein said upper surface comprises at least 90 percent of said support area.

Clause 6: A first pallet assembly stackable on a second pallet assembly, each pallet assembly comprising: a support assembly including: a deck including an upper surface, a lower surface, and a thickness between said upper surface and lower surface, wherein said deck defines a plurality of apertures that extend through said thickness of said deck; at least one resilient insert including an upper face and a lower face positioned within one of said apertures in said deck, wherein the upper face of said resilient insert protrudes from said upper surface of said deck, and wherein the lower face of said resilient insert protrudes from or is flush with said lower surface of said deck; a plurality of blocks extending away from said lower surface of said deck; a stringer including a bottom surface defining a plurality of recesses, wherein said stringer is positioned parallel to the deck of said support assembly, and wherein said stringer is attached to said plurality of blocks so that said stringer is connected to said support assembly; and, wherein said recesses on the bottom surface of said stringer of the first pallet assembly are positioned to correspond with said apertures defined through the upper surface of said deck of the second pallet assembly so that when said stringer of the first pallet assembly is placed on top of said support assembly of the second pallet assembly, said resilient insert of the second pallet assembly fits into a respective recess in said stringer of the first pallet assembly.

Clause 7: A first pallet assembly stackable on a second pallet assembly, each pallet assembly comprising: a support assembly including: a deck including an upper surface and a lower surface, and a plurality of grip protrusions positioned on said upper surface of said deck; a plurality of blocks extending from the lower surface of said deck; a stringer including a bottom surface defining a plurality of grip indents, wherein said stringer is positioned parallel to the deck of said support assembly, and wherein said stringer is attached to said plurality of blocks so that said stringer is connected to said support assembly; and, wherein said grip indents in said stringer of the first pallet assembly are positioned to correspond with said grip protrusions on the deck of the second pallet assembly so that when the stringer from the first pallet assembly is stacked on top of the support assembly of the second pallet assembly, said grip protrusions fit into said grip indents and resist the pallets from moving relative to each other.

Wherein any of the above Clauses can optionally include a width of said body portion being greater than a width of said extension portion on each block; and/or said body portion may include a bottom surface and wherein said bottom surface contacts a top surface of said stringer when said block extends through the opening; and/or wherein said plurality of blocks are spaced apart, defining gaps between adjacent blocks, and wherein the gaps are adapted to accommodate forklift forks between adjacent blocks.

Any of the above Clauses may also optionally further be defined by: wherein a particular extension portion further comprises a projection that extends away from said particular extension; and, wherein a particular opening in said stringer that said particular extension extends through defines a recess adapted to receive said projection, wherein, when said projection is received in the recess, said projection and the recess resist removal of said particular extension portion from the particular opening and wherein said particular extension and said projection are adapted to deflect to pass through the particular opening when first inserting said particular extension through the particular opening; and/or wherein said projection has an outer diameter larger than an inner diameter of the particular opening; and/or may further comprise a weld between said support assembly and said stringer; and/or wherein said weld is selected from the group consisting of a spin weld, an ultrasonic weld and a hotplate weld and/or wherein each of said plurality of blocks includes: an outer surface that defines a plurality of vertical grooves extending along an outer surface of said body portion of said blocks.

Any of the above Clauses may also optionally further be defined by: a plurality of apertures defined in said deck, wherein said apertures extend through said upper surface; wherein said upper surface and said apertures define a support area; and, wherein said upper surface comprises at least 90 percent of said support area and/or wherein at least two of said apertures are adapted as hand holds for carrying said pallet assembly and/or at least one resilient insert including an upper face; wherein said resilient insert is positioned within one of said apertures in said deck; and wherein the upper face of said resilient insert protrudes from said upper surface of said deck and/or wherein said deck includes grip protrusions that extend from said upper surface of said deck and/or wherein said stringer defines a plurality of grip indents on a bottom surface of said stringer that correspond to the position of said grip protrusions so that when the stringer from a first pallet assembly is stacked on top of the support assembly of a second pallet assembly, said grip protrusions align with said grip indents and/or wherein said blocks include a block support member that extends into the common internal space and wherein said block support member defines an open cavity and/or wherein said block support member is conical in shape and/or wherein said support assembly includes a tracking device positioned within the open cavity defined by said block support member and/or wherein said support assembly includes a tracking device for tracking the pallet assembly.

Any of the above Clauses may also optionally further be defined by: wherein said support assembly includes nine blocks and/or wherein said plurality of blocks are arranged so that a majority of said extension portions align with and are directly above the frame of a standard warehouse rack when the pallet assembly is placed on the warehouse rack and/or wherein an entirety of said support assembly and said stringer can be recycled for use as a component of the mixture of plastic and non-plastic material used in the production of future pallet assemblies and/or wherein said support assembly is formed by rotational molding and/or wherein said deck and said stringer are molded separately.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

The invention claimed is:
1. A pallet assembly comprising:
a support assembly comprising a contiguous outer shell molded from a plastic shell material, wherein said outer shell is filled with a support material that comprises a mixture of both plastic and non-plastic materials and wherein said support assembly includes:
a deck that has a upper surface and a lower surface;
a plurality of blocks that extend away from the lower surface of said deck, each block including a body portion and an extension portion, wherein said plurality of blocks are unitarily formed with said deck such that said contiguous outer shell defines a common internal space that extends between said deck and said plurality of blocks, wherein the common internal space is filled with said support material;

a stringer having a thickness, wherein said stringer defines a plurality of openings that each extend through the thickness of said stringer; and, wherein each extension portion of the plurality of blocks extends completely through an individual opening in said stringer and wherein said stringer is attached to said support assembly.

2. The pallet assembly of claim 1, wherein a width of said body portion is greater than a width of said extension portion on each block.

3. The pallet assembly of claim 1, wherein said body portion includes a bottom surface and wherein said bottom surface contacts a top surface of said stringer when said block extends through the opening.

4. The pallet assembly of claim 1, wherein said plurality of blocks are spaced apart, defining gaps between adjacent blocks, and wherein the gaps are adapted to accommodate forklift forks between adjacent blocks.

5. The pallet assembly of claim 1,
wherein said extension portion comprises an extension which comprises a projection that extends away from said extension; and,
wherein one of the plurality of openings in said stringer that said extension extends through defines a recess adapted to receive said projection, wherein, when said projection is received in the recess, said projection and the recess resist removal of said extension portion from the one of the plurality of openings and wherein said extension and said projection are adapted to deflect to pass through the one of the plurality of openings when first inserting said extension through the one of the plurality of openings.

6. The pallet assembly of claim 5,
wherein said projection has an outer diameter larger than an inner diameter of the one of the plurality of openings.

7. The pallet assembly of claim 1, wherein each of said plurality of blocks includes:
an outer surface that defines a plurality of vertical grooves extending along an outer surface of said body portion of said blocks.

8. The pallet assembly of claim 1, further comprising:
a plurality of apertures defined in said deck, wherein said apertures extend through said upper surface;
wherein said upper surface and said apertures define a support area; and,
wherein said upper surface comprises at least 90 percent of said support area.

9. The pallet assembly of claim 8, further comprising:
at least one resilient insert including an upper face;
wherein said resilient insert is positioned within one of said apertures in said deck; and
wherein the upper face of said resilient insert protrudes from said upper surface of said deck.

10. The pallet assembly of claim 1, wherein said deck includes grip protrusions that extend from said upper surface of said deck.

11. The pallet assembly of claim 10, wherein said stringer defines a plurality of grip indents on a bottom surface of said stringer that correspond to the position of said grip protrusions so that when the stringer from a first pallet assembly is stacked on top of the support assembly of a second pallet assembly, said grip protrusions align with said grip indents.

12. The pallet assembly of claim 1, wherein said blocks include a block support member that extends into the common internal space and wherein said block support member defines an open cavity.

13. The pallet assembly of claim 12, wherein said block support member is conical in shape.

14. The pallet assembly of claim 13, wherein said support assembly includes a tracking device positioned within the open cavity defined by said block support member.

15. The pallet assembly of claim 1, wherein an entirety of said support assembly and said stringer can be recycled for use as a component of the mixture of plastic and non-plastic material used in the production of future pallet assemblies.

16. The pallet assembly of claim 1, wherein said support assembly is formed by rotational molding.

17. The pallet assembly of claim 1, wherein said deck and said stringer are molded separately.

18. A pallet assembly comprising:
a support assembly comprising:
a deck that has an upper surface and a lower surface;
a plurality of blocks that extend away from the lower surface of said deck, each block including a body portion and an extension portion comprising an extension, and wherein said extension further comprises a projection that extends away from said extension;
a stringer positioned parallel to the deck of said support assembly, wherein said stringer defines a plurality of openings that each receive a corresponding one of said blocks of said support assembly; and,
wherein one of the plurality of openings in said stringer that said extension extends through defines a recess adapted to receive said projection, wherein, when said projection is received in the recess, said projection and the recess resist removal of said extension portion from the one of the plurality of openings and wherein said extension and said projection are adapted to deflect to pass through the one of the plurality of openings when first inserting said extension through the one of the plurality of openings.

19. The pallet assembly of claim 18, wherein said projection has an outer diameter larger than an inner diameter of the one of the plurality of openings.

* * * * *

UNITED STATES PATENT AND TRADEMARK OFFICE
CERTIFICATE OF CORRECTION

PATENT NO. : 10,589,897 B1
APPLICATION NO. : 16/101956
DATED : March 17, 2020
INVENTOR(S) : Omar Shawaf et al.

It is certified that error appears in the above-identified patent and that said Letters Patent is hereby corrected as shown below:

In the Claims

Column 15, Claim 5, Line 27, delete the word "portion."
Column 16, Claim 18, Line 44, delete the word "portion."

Signed and Sealed this
Fourteenth Day of July, 2020

Andrei Iancu
*Director of the United States Patent and Trademark Office*